(12) United States Patent
Levin et al.

(10) Patent No.: US 6,311,173 B1
(45) Date of Patent: Oct. 30, 2001

(54) PATTERN RECOGNITION USING GENERALIZED ASSOCIATION RULES

(75) Inventors: Boris Levin, Rishon le Zion; Abraham Meidan, Tel Aviv; Alex Cheskis, Ma'ale Adumim, all of (IL)

(73) Assignee: Wizsoft Ltd., Tel Aviv (IL)

( * ) Notice: Subject to any disclaimer, the term of this patent is extended or adjusted under 35 U.S.C. 154(b) by 0 days.

(21) Appl. No.: 09/169,723

(22) Filed: Oct. 9, 1998

(30) Foreign Application Priority Data

Jan. 5, 1998 (IL) ........................................ 122850

(51) Int. Cl.[7] ............................ G06F 15/18; G06F 17/00; G06F 17/30; G06F 7/00

(52) U.S. Cl. .................................. 706/21; 706/45; 707/6; 707/1

(58) Field of Search ........................... 706/21, 45; 707/6, 707/1

(56) References Cited

U.S. PATENT DOCUMENTS

| | | | | |
|---|---|---|---|---|
| 5,615,309 | * | 3/1997 | Bezek et al. | 706/50 |
| 5,692,107 | * | 11/1997 | Simoudis et al. | 706/12 |
| 5,724,573 | * | 3/1998 | Agrawal et al. | 707/6 |
| 5,727,199 | * | 3/1998 | Chen et al. | 707/6 |
| 5,794,209 | * | 8/1998 | Aggarwal et al. | 705/10 |
| 5,983,222 | * | 11/1999 | Morimoto et al. | 707/6 |
| 6,092,064 | * | 7/2000 | Aggarwal et al. | 707/6 |

OTHER PUBLICATIONS

Agrawal et al, "Mining Association Rules Between Sets of Items in Large Databases", Proceedings of the 1993 ACM SIGMOD International Conference on Management of Data, May 1993.*

Klemettinen et al, "Finding Interesting Rules from Large Sets of Discovered Association Rules", Proceedings of 3rd International Conference on Information and Knowledge Management, Nov.–Dec. 1994.*

Fukuda et al, "Mining Optimized Association Rules for Numeric Attributes", Proceedings of the 15th ACM SIGACT–SIGMOD–SIGART Symposium on Principles of Data Systems, Jun. 1996.*

El Fattah, "Learning Multiple Fault Diagnosis", Proceedings of the 7th IEEE Conference on Artificial Intelligence for Applications, Feb. 1991.*

(List continued on next page.)

*Primary Examiner*—George B. Davis
(74) *Attorney, Agent, or Firm*—Wolf, Greenfield & Sacks, PC

(57) ABSTRACT

A method and system for predicting an unknown value of an attribute of interest of a given item from a population of items, each item in the population having a plurality of variable attributes including the attribute of interest. Known attribute values regarding a training sample of items within the population including the attribute of interest are stored in a memory. The stored attribute values are processed to determine association rules regarding the training sample, including at least one generalized association rule, each association rule including one or more conditions on one or more respective attribute values of the items predictive of the value of the attribute of interest, and the at least one generalized rule including a logical combination of a plurality of such conditions using at least one logical operation from the group consisting of disjunction and negation. Data are received from an input device, the data including values of at least some of the attributes of the given item. The association rules including the at least one generalized association rule are applied to the values included in the data so as to predict the unknown value of the attribute of interest of the given item.

108 Claims, 10 Drawing Sheets

OTHER PUBLICATIONS

Agrawal, et al., "Fast Discovery of Association Rules", in Advances in Knowledge Discovery and Data Mining (AAAI Press/MIT Press, 1996), pp. 307–328.

Zaki, et al., "New Algorithms for Fast Discovery of Association Rules", in Proc. 3rd Int. Conf. KKD (California), pp. 283–286.

Friedman, "On Bias, Variance, 0/1—Loss and the Curse-of-Dimensionality", in Data Mining and Knowledge Discovery, 1(1), pp. 54–77.

Heckerman, "Bayesian Networks for Data Mining", in Data Mining and Knowledge Discovery, 1(1), pp. 79–119.

* cited by examiner

Array $C_2$

| line j | $k_1$ | $i_1$ | $k_2$ | $i_2$ |
|---|---|---|---|---|
| 1 | 1 | 1 | 2 | 1 |
| 2 | 1 | 1 | 3 | 2 |
| 3 | 1 | 1 | 4 | 1 |
| 4 | 1 | 2 | 2 | 3 |
| 5 | 1 | 2 | 3 | 1 |
| 6 | 2 | 1 | 3 | 1 |
| 7 | 2 | 3 | 4 | 1 |
| 8 | 2 | 3 | 4 | 3 |
| 9 | 3 | 1 | 5 | 2 |
| 10 | 3 | 2 | 4 | 1 |
| 11 | 4 | 2 | 6 | 1 |
| 12 | 5 | 2 | 6 | 3 |

FIG. 5A

| $k_1$ | 1 | 2 | 3 | 4 | 5 |
|---|---|---|---|---|---|
| $\hat{m}_{k_1}$ | 0 | 3 | 6 | 9 | 12 |

| r | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| frequency of ($k_1, i_1$) | 0 | 3 | 2 | 0 | 1 | 0 | 2 | 1 | 1 | 0 | 0 | 1 | 0 | 0 | 1 | 0 |
| $g_r$ | 0 | 3 | 5 | 5 | 6 | 6 | 8 | 9 | 10 | 10 | 10 | 11 | 11 | 11 | 12 | 12 |

FIG. 5B

Array $\hat{C}_3$

| line j | $k_1, i_1$ | $k_2, i_2$ | $k_3, i_3$ |
|---|---|---|---|
| 1 | 1, 1 | 3, 2 | 4, 1 |

FIG. 5C

| Record $i$ | Condition of rule $j$ | |
|---|---|---|
| | $J_1$ | $J_0$ |
| $I_1$ | I | III |
| $I_0$ | II | IV |

FIG. 6

| Type | Generalized Association Rule | |
|---|---|---|
| | if | then |
| 1 | $\neg (C_{j_1}^{(1)} \vee C_{j_2}^{(1)} \vee \ldots \vee C_{j_k}^{(1)})$ | $y = 0$ |
| 2 | $\neg (C_{j_1}^{(0)} \vee C_{j_2}^{(0)} \vee \ldots \vee C_{j_k}^{(0)})$ | $y = 1$ |
| 3 | $(C_{j_1}^{(1)} \vee \ldots \vee C_{j_k}^{(1)}) \wedge \neg (C_{j_{k+1}}^{(0)} \vee \ldots \vee C_{j_K}^{(0)})$ | $y = 1$ |
| 4 | $(C_{j_1}^{(0)} \vee \ldots \vee C_{j_k}^{(0)}) \wedge \neg (C_{j_{k+1}}^{(1)} \vee \ldots \vee C_{j_K}^{(1)})$ | $y = 0$ |

FIG. 7

| Number of record (i) | Number of rule (j) | | | | | | | | | | | | Field to Predict |
|---|---|---|---|---|---|---|---|---|---|---|---|---|---|
| | 1 | 2 | 3 | 4 | 5 | 6 | 7 | 8 | 9 | 10 | 11 | 12 | |
| 1 | 1 | | | | 1 | | | | | 1 | | | $y = 1$ |
| 2 | | 1 | | 1 | | | | | 1 | | 1 | | $y = 1$ |
| 3 | 1 | | | | | 1 | | | | | | | $y = 1$ |
| 4 | | | 1 | | 1 | | 1 | | | | | | $y = 1$ |
| 5 | | | 1 | 1 | | | | | | | 1 | | $y = 1$ |
| 6 | | 1 | | | | 1 | | 1 | | | | | $y = 1$ |
| 7 | 1 | | 1 | | | | 1 | | 1 | | | | $y = 0$ |
| 8 | | 1 | | | | | 1 | | | 1 | | | $y = 0$ |
| 9 | | | | 1 | 1 | | 1 | | | | | 1 | $y = 0$ |
| 10 | | | 1 | | | | 1 | 1 | | | 1 | | $y = 0$ |
| 11 | 1 | 1 | | | | | | 1 | 1 | | | | $y = 0$ |
| 12 | | 1 | 1 | | | | | 1 | | 1 | | | $y = 0$ |
| 13 | 1 | | | | | | | 1 | | | | 1 | $y = 0$ |
| 14 | | | | 1 | | | | | 1 | | | | $y = 0$ |
| 15 | | | | | | 1 | | | | | 1 | | $y = 0$ |
| 16 | | | | 1 | | | | | 1 | | | 1 | $y = 0$ |
| 17 | | | | | 1 | 1 | | | | | 1 | | $y = 0$ |
| 18 | | | | | | | | | | 1 | | 1 | $y = 0$ |
| 19 | | | | | | 1 | | | | | 1 | | $y = 0$ |
| 20 | | | | | 1 | | | | | 1 | | | $y = 0$ |

FIG. 8A

| No | Generalized Association Rule | | Support | Numbers of Records Covered |
|---|---|---|---|---|
| | if | then | | |
| 1 | $\neg(C_1^{(1)} \vee C_2^{(1)} \vee C_3^{(1)})$ | $y = 0$ | 8 | 9,14,15,16, 17,18,19,20 |
| 2 | $\neg(C_4^{(1)} \vee C_5^{(1)} \vee C_6^{(1)})$ | $y = 0$ | 7 | 7,8,10,11, 12,13,18 |
| 3 | $\neg(C_9^{(0)} \vee C_{10}^{(0)} \vee C_{11}^{(0)} \vee C_{12}^{(0)})$ | $y = 1$ | 3 | 3,4,6 |
| 4 | $(C_1^{(1)} \vee C_2^{(1)} \vee C_3^{(1)}) \wedge \neg(C_7^{(0)} \vee C_8^{(0)})$ | $y = 1$ | 4 | 1,2,3,5 |
| 5 | $(C_9^{(0)} \vee C_{10}^{(0)} \vee C_{11}^{(0)} \vee C_{12}^{(0)}) \wedge \neg(C_4^{(1)} \vee C_5^{(1)})$ | $y = 0$ | 9 | 7,8,10,11, 12,13,15,18, 19 |

FIG. 8B

| Serial number of column | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Number of record ($i$) | 3 | 1 | 4 | 5 | 6 | 17 | 2 | 7 | 9 | 11 | 12 | 14 | 15 | 19 | 20 | 8 | 13 | 16 | 10 | 18 |
| Mean probability that $y=1$ | .4 | .33 | .33 | .33 | .33 | .33 | .3 | .3 | .3 | .3 | .3 | .3 | .3 | .3 | .3 | .3 | .27 | .27 | .27 | .25 | .2 |
| Predicted value of $y$ | 1 | 1 | 1 | 1 | 1 | 1 | 0 | 0 | 0 | 0 | 0 | 0 | 0 | 0 | 0 | 0 | 0 | 0 | 0 | 0 |
| Real value of $y$ | 1 | 1 | 1 | 1 | 1 | 0 | 1 | 0 | 0 | 0 | 0 | 0 | 0 | 0 | 0 | 0 | 0 | 0 | 0 | 0 |

FIG. 9

| Number of record (*i*) | Number of Generalized Rule | | | | |
|---|---|---|---|---|---|
| | 1 | 2 | 3 | 4 | 5 |
| 1 | | | | 1 | |
| 2 | | | | 1 | |
| 3 | | | 1 | 1 | |
| 4 | | | 1 | | |
| 5 | | | | 1 | |
| 6 | | | 1 | | |
| 7 | | 0 | | | 0 |
| 8 | | 0 | | | 0 |
| 9 | 0 | | | | |
| 10 | | 0 | | | 0 |
| 11 | | 0 | | | 0 |
| 12 | | 0 | | | 0 |
| 13 | | 0 | | | 0 |
| 14 | 0 | | | | |
| 15 | 0 | | | | 0 |
| 16 | 0 | | | | |
| 17 | 0 | | | | |
| 18 | 0 | 0 | | | 0 |
| 19 | 0 | | | | 0 |
| 20 | 0 | | | | |

FIG. 10

PATTERN RECOGNITION USING GENERALIZED ASSOCIATION RULES

FIELD OF THE INVENTION

The present invention relates generally to systems and methods for pattern recognition, and specifically to methods of pattern recognition based on association rules.

BACKGROUND OF THE INVENTION

Automated pattern recognition is well known in the art, in a variety of applications. Common applications of pattern recognition include image analysis, speech recognition, and predicting unknown fields for records in a database. Typically, a template or a collection of rules is determined, which are believed to constitute a pattern that is characteristic of a certain class. Items in the set are then evaluated to determine how closely they fit the pattern. A close fit indicates a high probability that the item being evaluated falls within the class. Thus, a face may be found to belong to a certain individual; or a spoken sound may be found to correspond to a certain word; or a bank customer may be predicted to be a good or bad credit risk.

In order to build the template or rules, "data mining" of a training database is frequently used. The training database is selected and is assumed to be a real and representative sample of the overall population. The training database generally contains variables (fields, representing various attributes of the items) of different types, among which a field is selected as the "Field to Predict" (also referred to in the database art as the "output", or "result", or "dependent" variable). The training database may be represented as a temporary file of codes of attribute values, given by the matrix:

$$A = \{x_1, \ldots, x_n, y\}_1^N \tag{1}$$

consisting of N records, where a record is a vector of previously encoded values of n input (predicting) fields $x_1, \ldots, x_n$ and of the output (predicted) field y. The purpose is to discover all essential regularities within the investigated file A, thus enabling one to predict the unknown value of output field y based on the known values of variables $x_1, \ldots, x_n$. The same encoding methods may be applied when the rules derived from the training database are applied to the rest of the population.

Typically, the Field to Predict is Boolean, i.e., the output field can be specified as $y \in \{0,1\}$. It will be understood, however, that similar methods may be applied, mutatis mutandis, when the output field has a wider range of possible values.

The accuracy of prediction of the value of y may be verified by testing on the training database. However, such testing may not be sufficient, since there exists the problem of "overfitting," wherein regularities discovered on the training database turn out to be found by chance, and are therefore not valid on other samples from the overall population. Thus, the purpose of data mining is to discover regularities within the training database which possess the property of likely stability of their validity on the whole population.

Regularities of this sort are sought within the training database in the form of association rules. Methods of deriving such association rules are described, for example, by Agrawal, et al., in "Fast Discovery of Association Rules," in *Advances in Kowledge Discovery and Data Mining* (AAAI Press/MIT Press, 1996), pages 307–328; and by Zaki, et al., in "New Algorithms for Fast Discovery of Association Rules," in Proc. 3rd Int. Conf. KDD (California), pages 283–286. These publications are incorporated herein by reference.

A formal definition of an association rule is as follows: Let $I_i = \{a_{i1}, \ldots, a_{im_i}\}$ be the set of codes of values of a variable $x_i$. A single condition (referred to herein as a 1-condition) is a condition of the type: $x_i = a_{ij}$, $j \in \{1, \ldots, m_i\}$. A composite condition is a conjunction of q single conditions, wherein $q = 2, \ldots, n$, referred to herein as a q-condition. Thus, a q-condition is a condition of the type:

$$(x_{i_1} = a_{i_1 j_1}) \wedge (x_{i_2} = a_{i_2 j_2}) \wedge \ldots \wedge (x_{i_q} = a_{i_q j_q}) \tag{2}$$

Association rules are "if-then" rules, wherein the condition is the single or conjunctive expression, as in equation (2). Such rules are referred to in the context of the present patent application and in the claims as "simple association rules." Thus, a simple association rule is a statement of the following type:

$$\text{if } (q\text{-condition}) \text{ then } y = y_1 \tag{3}$$

The possible values of $y_1$ are $y_1 = 1$ or $y_1 = 0$. The number s of records at which both the condition of the rule (the q-condition) and the rule's conclusion ($y = y_1$) are fulfilled is referred to as the support, s, of the rule. The probability p of the rule is the probability that for a random record satisfying the rule's condition, the rule's conclusion is also fulfilled. Hence $$p = \frac{s}{m},$$

wherein m is the number of records satisfying the rule's condition.

Let $p_a$ be the a priori probability that the Field to Predict y possesses the predicted value 1, that is, $$p_a = \frac{r}{N},$$

where r is the number of records in the training database at which $y = 1$. As mentioned above, the training database is assumed to be a real and representative sample of the investigated population. Hence, it can be assumed that the same a priori probability $p_a$ is valid on the overall population.

Which rules are interesting? In other words, about which rules can it be said that they were discovered not by chance, and are likely to be valid on the overall population? It can be assumed that these are rules fulfilled at a sufficiently large number of records and whose probability significantly deviates from $p_a$. A formal statement for this intuitive notion is as follows: A user specifies a minimum support $S_{min}$, and minimum admissible probabilities for a rule with $y = 1$ (denoted by $\bar{p}_1$) and with $y = 0$ (denoted by $\bar{p}_0$), $1 - \bar{p}_0 < p_a < \bar{p}_1$. The objective of the data mining is then to determine association rules (rules of the type of equation (2)) for which $s \geq S_{min}$ and $p \geq \bar{p}_1$ (if $y = 1$), or $p \geq \bar{p}_0$ (if $y = 0$). Methods of data mining known in the art do not necessarily find all such rules exhaustively on the training database, and furthermore tend to require very substantial computing resources.

The rule defined by equation (3) can be expressed as a statement of conditional probability:

$$P(y = y_1 | (\text{the } q\text{-condition})) = p \tag{4}$$

However, unlike equation (3), the number of records at which this statement is fulfilled (support s) is absent in equation (4). Therefore, association rules in a sense contain more information than conditional probabilities, which are applied in Bayes methods. Such methods are described, for example, by Friedman, in "On Bias, Variance, 0/1—Loss, and the Curse-of-Dimensionality," in *Data Mining and Knowledge Discovery*, 1(1), pages 54–77; and by Heckerman, in "Bayesian Networks for Data Mining," in *Data Mining and Knowledge Discovery*, 1(1), pages 79–119. These publications are incorporated herein by reference.

As mentioned above, the object of deriving association rules from the training database is to predict accurately the Field to Predict value for data outside the training database. To predict the value of output field y for a given record, all relevant association rules are selected, and using the respective probabilities of these rules, the conclusive probability that the Field to Predict possesses the predicted value is calculated. Such prediction gives especially accurate results when a great number of "strong" association rules (rules with a high probability and support) are found, and many of them are independent or nearly independent. Methods of finding strong rules are described, for example, by Piatetsky-Shapiro, in "Discovery, Analysis, and Presentation of Strong Rules," in *Knowledge Discovery in Databases* (Menlo Park, Calif.: AAAI Press), pages 229–248, which is incorporated herein by reference. These methods apply to finding simple association rules, as defined by expression (2), above.

The number of simple association rules determined is usually large and may even exceed (sometimes considerably) the number of records in the training database. Therefore, the average number of relevant rules for each record may also be large. Among the relevant rules there are often a large number of "weak" rules caused by "noise" —random data fluctuations—which complicate prediction. On the other hand, if only "strong" rules are allowed, there will be many records to which no relevant rules apply.

SUMMARY OF THE INVENTION

It is an object of the present invention to provide improved systems and methods of pattern recognition. In some aspects of the present invention, these systems and methods are used for predicting an attribute of one or more items in a population.

It is an object of some aspects of the present invention to enable the attributes to be predicted with greater accuracy and reliability.

It is a further object of some aspects of the present invention to enable the attributes to be predicted more rapidly and/or at a lower expenditure of computing resources.

In preferred embodiments of the present invention, a training database is selected out of an overall population of items, and simple association rules regarding the training database are determined. Preferably, the simple association rules that are determined have a support greater than or equal to a predetermined minimum support and a probability greater than or equal to a predetermined minimum probability. The simple association rules are used to determine generalized association rules, as defined hereinbelow. The generalized association rules and, optionally, the simple association rules are then applied to one or more members of the population outside the training database so as to predict an unknown value of an attribute or attributes of interest of the one or more members.

The term "generalized association rules," as used in the present patent application and in the claims, refers to rules that use logical operations of conjunction, disjunction, and negation in defining their conditions. As described above, methods of data mining and prediction known in the art use only simple association rules, based only on the logical conjunction operation. Methods in accordance with the present invention, using generalized association rules, provide "stronger" and more stable rules, which afford more accurate and reliable prediction, at lower expenditure of computing resources, than methods known in the art. Furthermore, the present invention substantially overcomes the problem of overfitting, which exists in methods known in the art.

In some preferred embodiments of the present invention, before determining, the generalized association rules, substantially all of the simple association rules meeting the minimum support and minimum probability criteria are found, using generalized contingency tables and sets of potentially representative q-conditions for each possible value of q. Methods of data mining known in the art do not use contingency tables and are not capable of conclusively finding all simple association rules. Because methods in accordance with the present invention find an exhaustive set of rules, they allow the attributes of the items in the database to be predicted with the highest possible level of confidence.

In some preferred embodiments of the present invention, the unknown value of the attribute of interest is predicted based on a cumulative probability, which is calculated based on probabilities corresponding to the generalized and/or simple association rules. A probabilistic decision point is defined, such that the unknown value is predicted based on whether the cumulative probability is above or below the decision point. Preferably, the decision point is defined so as to minimize a total number of prediction errors or, alternatively, when error costs are given, to minimize a total cost of errors. In a preferred embodiment of the invention, an ambiguous range of probabilities is defined, including the decision point, wherein the extent of the range is dependent on a measure of similarity or dissimilarity between the training sample and the overall population for prediction.

Preferred embodiments of the present invention are described herein with reference to methods and systems for data mining and prediction of unknown fields in a database. It will be appreciated, however, that the principles of the present invention may similarly be applied in other areas of pattern recognition. For example, generalized association rules may be derived for use in image or voice recognition, and may thus be used to identify with improved accuracy, reliability, and computation speed the identity of an item in the image or the word associated with a spoken sound pattern.

There is therefore provided, in accordance with a preferred embodiment of the present invention, a method for predicting an unknown value of an attribute of interest of a given item from a population of items, each item in the population having a plurality of variable attributes including the attribute of interest, including:

storing in a memory known attribute values regarding a training sample of items within the population including the attribute of interest; and processing the stored attribute values to determine association rules regarding the training sample, including at least one generalized association rule, each association rule including one or more conditions on one or more respective attribute values of the items predictive of the value of the attribute of interest, and the at least one generalized rule including a logical combination of a plurality of such conditions using at least one logical operation from the group consisting of disjunction and negation.

Preferably, the method includes receiving data from an input device, the data including values of at least some of the attributes of the given item; and applying the association rules including the at least one generalized association rule to the values included in the data so as to predict the unknown value of the attribute of interest of the given item.

Preferably, processing the attribute values includes finding the at least one generalized rule such that a support of the rule is maximized on the training sample. Further preferably, finding the at least one generalized rule includes finding a generalized association rule predicting that the attribute of interest has a given value, such that the support of the generalized rule in the training sample includes at least ten times as many items having the given value of the attribute of interest as having another value, not equal to the given value, and most preferably, finding a rule whose support in the training sample comprises substantially only items having the given value of the attribute of interest.

Preferably, processing the attribute values includes finding a plurality of generalized association rules such that an overlap of the respective supports of two or more of the plurality of rules on the training sample is minimized.

Further preferably, processing the attribute values includes finding a plurality of generalized association rules such that substantially all of the items in the training sample are included in the support of one or more of the generalized rules. Most preferably, finding the plurality of generalized rules includes finding first and second groups of generalized rules that are respectively predictive of first and second values of the attribute of interest, such that there is an approximately equal number of rules in each group.

In a preferred embodiment, the at least one generalized association rule includes a rule predicting that the attribute of interest has a first value if a condition substantially of a form $\neg(C_{j1}^{(i)} \vee C_{j2}^{(i)} \vee \ldots \vee C_{jk}^{(i)})$ is fulfilled, wherein each $C_{jm}^{(i)}$ represents a condition on a known attribute value of the item other than the attribute of interest which is predictive that the attribute of interest will have another value, different from the first value.

In another preferred embodiment, the at least one generalized association rule includes a rule predicting that the attribute of interest has a first value if a condition substantially of a form $(C_{j1}^{(i_1)} \vee C_{j2}^{(i_1)} \vee \ldots \vee C_{jK}^{(i_1)}) \neg(C_{jk+1}^{(i_2)} \vee C_{jk+2}^{(i_2)} \vee \ldots \vee C_{jK}^{(i_2)})$ is fulfilled, wherein each $C_{jm}^{(i_1)}$ represents a condition on a known attribute value of the item other than the attribute of interest which is predictive that the attribute of interest will have the first value, and each $C_{jm}^{(i_2)}$ represents a condition on a known attribute value of the item other than the attribute of interest which is predictive that the attribute of interest will have another value, different from the first value. Preferably, processing the attribute values includes finding the set of rules $\{C_{j1}^{(i_1)} \ldots C_{jk}^{(i_1)}\}$ and then searching for rules in the set $\{C_{jk+1}^{(i_2)} \ldots C_{jK}^{(i_2)}\}$ on the support of $\{C_{j1}^{(i_1)} \ldots C_{jk}^{(i_1)}\}$.

Preferably, processing the attribute values includes finding simple association rules, wherein each simple association rule includes one or more conditions on one or more respective attribute values of the items predictive of the value of the attribute of interest, such that if the simple association rule includes more than one such condition, the conditions are combined using the logical conjunction operation in defining the conditions of the rule. Further preferably, applying the association rules includes applying both the simple and the at least one generalized association rules jointly to predict the unknown value, wherein applying the rules jointly preferably includes computing a weighted sum of values of the attribute of interest predicted by the rules. Preferably, computing the weighted sum includes computing probabilities respectively associated with the simple and generalized rules, and weighting the predicted values by the respective probabilities.

Preferably, finding the association rules includes finding the at least one generalized association rule by combining a plurality of the simple association rules, most preferably by finding a generalized rule which includes a disjunction of two or more of the simple rules or, additionally or alternatively, by finding a generalized rule which includes a negation of one or more of the simple rules.

Preferably, determining the simple association rules includes determining substantially all simple association rules pertaining to the sample having respective probability and support greater than predetermined minimum values thereof There is further provided, in accordance with a preferred embodiment of the present invention, a method for predicting an unknown value of an attribute of interest of a given item from a population of items, each item in the population having a plurality of variable attributes including the attribute of interest, including:

storing in a memory known attribute values regarding a training sample of items within the population including the attribute of interest;

processing the attribute values to determine simple association rules regarding the training sample, each simple association rule including one or more conditions on one or more respective attribute values of the items predictive of the value of the attribute of interest, such that if the simple association rule includes more than one such condition, the conditions are combined using the logical conjunction operation in defining the conditions of the rule, wherein substantially all simple association rules applicable to the sample having respective probability and support greater than predetermined minimum values thereof are determined;

receiving data from an input device, the data including values of at least some of the attributes of the given item; and applying the association rules to the values included in the data so as to predict the unknown value of the attribute of interest of the given item.

Preferably, processing the attribute values includes constructing a contingency table, each of whose entries corresponds to the number of items in the sample having a given value of the attribute of interest and a given, respective value of another one of the attributes, and wherein the association rules are determined with respect to the contingency table.

There is also provided, in accordance with a preferred embodiment of the present invention, a method for predicting an unknown value of an attribute of interest of a given item from a population of items, each item in the population having a plurality of variable attributes including the attribute of interest, including:

storing in a memory known attribute values regarding a training sample of items within the population including the attribute of interest;

processing the attribute values to determine association rules regarding the training sample, each association rule including one or more conditions on one or more respective attribute values of the items predictive of the value of the attribute of interest, wherein the attribute values are processed by constructing a contingency table, each of whose entries corresponds to the number of items in the sample having a given value of the attribute of interest and satisfying a given, respective condition on one or more of the attributes other than the attribute of interest, and wherein the association rules are determined with respect to the contingency table;

receiving data from an input device, the data including values of at least some of the attributes of the given item; and applying the association rules to the values included in the data so as to predict the unknown value of the attribute of interest of the given item.

Preferably, constructing the contingency table includes constructing a table of 1-conditions, characterized in that the condition on the one or more of the attributes includes a condition on a single one of the attributes. Further preferably, constructing the contingency table includes constructing a table of 2-conditions, characterized in that the condition on the one or more of the attributes includes a condition on two of the attributes, using the table of 1-conditions. Most preferably, constructing the contingency table includes constructing a plurality of respective tables of q-conditions, for a sequence of one or more integers $q \geq 3$, characterized in that for each q, the condition on the one or more of the attributes includes a condition on a group of q of the attributes, wherein for each q, the corresponding table is constructed using the table of q-1-conditions previously constructed. Preferably, each of the tables of q-conditions is stored in the memory as it is constructed, and wherein for each q, the corresponding table of q-1-conditions is deleted from the memory after the table of q-conditions is constructed.

Preferably, processing the attribute values includes encoding values of the attributes according to the frequency of their occurrence in the training sample, most preferably by calculating hash functions. Preferably, encoding the values includes assigning a distinguishable code to values occurring at less than a predetermined frequency in the training sample, whereby such values are substantially excluded from the determination the of association rules.

Preferably, applying the association rules includes applying a subset of the rules consisting of rules whose one or more conditions are fulfilled by known values of attributes of the given item other than the item of interest.

Further preferably, processing the attribute values includes finding probabilities corresponding to the determined association rules, and applying the association rules includes applying the probabilities to compute a cumulative probability that the attribute of interest has a given value, wherein computing the cumulative probability preferably includes computing a weighted sum of the probabilities corresponding respectively to the association rules applied in predicting the value.

In a preferred embodiment, a probability decision point is determined such that when the cumulative probability is greater than the decision point, the attribute of interest is predicted to have a first value, and when the probability of interest is less than the decision point, the attribute of interest is predicted to have a different, second value. Preferably, determining the decision point includes defining an ambiguity range of probabilities including the decision point in which the predicted value is ambiguous, most preferably by comparing the training sample and at least a portion of the overall population from which the given item is taken, and determining an extent of the ambiguity range responsive to a measure of the similarity of the training sample and the at least portion of the overall population.

Preferably, determining the decision point includes determining a point such that a total number of prediction errors is minimized.

Alternatively, an error cost is assigned to each of a plurality of types of prediction errors, and determining the decision point includes determining a point such that a total cost of prediction errors is minimized.

In a preferred embodiment, the items include records in a database, and the attributes include fields in the records, and applying the association rules includes predicting the unknown value of a database field. Preferably, predicting the unknown value includes predicting a Boolean value.

In another preferred embodiment, the items include sounds, and the attribute values include characteristics of sound signals corresponding to the sounds, and applying the association rules includes identifying a sound signal. Preferably, identifying the sound signal includes finding a word corresponding to the signal. Alternatively or additionally, identifying the sound signal includes identifying a speaker who generated the sound signal. Preferably, receiving the data includes receiving data from a microphone.

In still another preferred embodiment, the items include images, and the attribute values include image features, and applying the association rules includes processing an image. Preferably, processing the image includes identifying a subject of the image. Further preferably, receiving the data includes receiving data from a camera or, alternatively or additionally, from a scanner.

Preferably, the method includes outputting an indication of the predicted value to an output device.

In a preferred embodiment, outputting the indication includes displaying the predicted value and a probability thereof.

In another preferred embodiment, outputting the indication includes controlling an access responsive to the predicted value.

In still another preferred embodiment, outputting the indication includes sorting the given item responsive to the predicted value.

There is further provided, in accordance with a preferred embodiment of the present invention, a system for predicting an unknown value of an attribute of interest of a given item from a population of items, each item in the population having a plurality of variable attributes including the attribute of interest, including:

an input device, which receives data indicative of values of at least some of the attributes of the given item;

a memory, which stores association rules regarding the population, the association rules including at least one generalized association rule, each association rule including one or more conditions on one or more respective attribute values of the items predictive of the value of the attribute of interest, and the at least one generalized rule including a logical combination of such conditions using at least one logical operation from the group consisting of disjunction and negation in defining the conditions of the rule; and a processor, which receives the data from the input device and reads the association rules from the memory, and which applies the association rules including the at least one generalized association rule to the values included in the data so as to predict the unknown value of the attribute of interest and which generates an output responsive to the prediction.

Preferably, the processor applies a subset of the rules consisting of rules whose one or more conditions are fulfilled by known values of attributes of the given item other than the item of interest.

Preferably, the processor finds probabilities corresponding to the determined association rules and applies the probabilities to compute a cumulative probability that the attribute of interest has a given value, wherein the processor preferably most preferably computes a weighted sum of the probabilities corresponding respectively to the association rules applied in predicting the value.

In a preferred embodiment, the processor determines a probability decision point such that when the cumulative probability is greater than the decision point, the attribute of interest is predicted to have a first value, and when the probability of interest is less than the decision point, the attribute of interest is predicted to have a different, second value. Preferably, the processor defines an ambiguity range of probabilities including the decision point in which the predicted value is ambiguous. Most preferably, the processor compares the training sample and at least a portion of the overall population from which the given item is taken, and determines an extent of the ambiguity range responsive to a measure of the similarity of the training sample and the at least portion of the overall population.

Preferably, the processor determines the decision point such that a total number of prediction errors is minimized.

Alternatively or additionally, an error cost is assigned to each of a plurality of types of prediction errors, and the processor determines the decision point such that a total cost of prediction errors is minimized.

In a preferred embodiment, the items include records in a database, and the attributes include fields in the records, and the processor applies the association rules to predict the unknown value of a database field. Preferably, the unknown value includes predicting a Boolean value.

In another preferred embodiment, the items include sounds, and the attribute values include characteristics of sound signals corresponding to the sounds, and the processor applies the association rules to identify a sound signal. Preferably, the processor finds a word corresponding to the signal. Additionally or alternatively, the processor identifies a speaker who generated the sound signal. Preferably, the input device includes a microphone.

In still another preferred embodiment, the items include images, and the attribute values include image features, and the processor applies the association rules to process an image. Preferably, the processor identifies a subject of the image. Preferably, the input device includes a camera or, additionally or alternatively, a scanner.

Preferably, the system includes an output device, which receives the output from the processor and performs an action responsive thereto.

In the output device includes a display, which displays the predicted value, preferably along with a probability associated with the predicted value.

In another preferred embodiment, the output device includes an access controller, which controls an access responsive to the predicted value.

In still another preferred embodiment, the output device includes a sorter, which sorts the given item responsive to the predicted value.

Preferably, the system includes a computer, which receives a training sample of items within the population having known respective attribute values including the attribute of interest, and which determines the association rules and finds the at least one generalized association rule by processing the known attribute values, wherein the computer preferably includes the processor.

There is additionally provided, in accordance with a preferred embodiment of the present invention, a system for determining association rules for prediction of an unknown value of an attribute of interest of a given item from a population of items, each item in the population having a plurality of variable attributes including the attribute of interest, including:

an input device, which receives data indicative of values of attributes of a training sample of items within the population including the attribute of interest;

a memory, which stores the values of the attributes, and a computer, which reads the values from the memory and determines association rules regarding the population, the association rules including at least one generalized association rule, each association rule including one or more conditions on one or more respective attribute values of the items predictive of the value of the attribute of interest, and the at least one generalized rule including a logical combination of such conditions using at least one logical operation from the group consisting of disjunction and negation in defining the conditions of the rule, and which stores the association rules in the memory.

Preferably, the computer finds the at least one generalized rule such that a support of the rule is maximized on the training sample, wherein the at least one generalized association rule preferably predicts that the attribute of interest has a given value, and the support of the generalized rule in the training sample includes at least ten times as many items having the given value of the attribute of interest as having another value, not equal to the given value. Most preferably, the support of the generalized association rule includes substantially only items having the given value of the attribute of interest.

Preferably, the computer finds a plurality of generalized association rules such that an overlap of the respective supports of two or more of the plurality of rules on the training sample is minimized.

Further preferably, the computer finds a plurality of generalized association rules such that substantially all of the items in the training sample are included in the support of one or more of the generalized rules.

In a preferred embodiment, the plurality of generalized rules includes first and second groups of generalized rules that are respectively predictive of first and second values of the attribute of interest, such that there is an approximately equal number of rules in each group.

In another preferred embodiment, the at least one generalized association rule includes a rule prediction that the attribute of interest has a first value if a condition substantially of a form $\neg(C_{j1}^{(i)} \vee C_{j2}^{(i)} \vee \ldots \vee C_{jk}^{(i)})$ is fulfilled, wherein each $C_{jm}^{(i)}$ represents a condition on a known attribute value of the item other than the attribute of interest which is predictive that the attribute of interest will have another value, different from the first value.

Alternatively or additionally, the at least one generalized association rule includes a rule predicting that the attribute of interest has a first value if a condition substantially of a form $(C_{j1}^{(i1)} \vee C_{j2}^{(i1)} \vee \ldots \vee C_{jk}^{(i1)}) \neg (C_{jk+1}^{(i2)} \vee C_{jk+2}^{(i2)} \vee \ldots \vee C_{jK}^{(i2)})$ is fufilled, wherein each $C_{jm}^{(i1)}$ represents a condition on a known attribute value of the item other than the attribute of interest which is predictive that the attribute of interest will have the first value, and each $C_{jm}^{(i2)}$ represents a condition on a known attribute value of the item other than the attribute of interest which is predictive that the attribute of interest will have another value, different from the first value. Preferably, the computer finds the set of rules $\{C_{j1}^{(i_1)} \ldots C_{jk}^{(i_1)}\}$ and then searches for rules in the set $\{C_{jk+1}^{(i_2)} \ldots C_{jK}^{(i_2)}\}$ on the support of $\{C_{j1}^{(i_1)} \ldots C_{jk}^{i_1}\}$.

Preferably, the computer finds simple association rules, wherein each simple association rule includes one or more conditions on one or more respective attribute values of the items predictive of the value of the attribute of interest, such that if the simple association rule includes more than one such condition, the conditions are combined using the logical conjunction operation in defining the conditions of the rule.

Preferably, the simple and the at least one generalized association rules are applied jointly to predict the unknown value.

In a preferred embodiment, a weighted sum of values of the attribute of interest predicted by the rules is used by the computer to predict the unknown value. Preferably, the computer computes probabilities respectively associated with the simple and generalized rules, which are used to weight the predicted values in computing, the weighted sum.

Preferably, the computer finds the at least one generalized association rule by combining a plurality of the simple association rules, wherein the at least one generalized rule preferably includes a disjunction of two or more of the simple rules or, alternatively or additionally, wherein the at least one generalized rule includes a negation of one or more of the simple rules.

Preferably, the computer determines substantially all simple association rules pertaining to the sample having respective probability and support greater than predetermined minimum values thereof There is moreover provided, in accordance with a preferred embodiment of the present invention, a system for determining association rules for prediction of an unknown value of an attribute of interest of a given item from a population of items, each item in the population having a plurality of variable attributes including the attribute of interest, including:

an input device, which receives data indicative of values of attributes of a training sample of items within the population including the attribute of interest;

a memory, which stores the values of the attributes; and a computer, which reads the values from the memory and determines simple association rules regarding the population, each simple association rule including one or more conditions on one or more respective attribute values of the items predictive of the value of the attribute of interest, such that if the simple association rule includes more than one such condition, the conditions are combined using the logical conjunction operation in defining the conditions of the rule, and which stores the association rules in the memory, wherein substantially all simple association rules applicable to the sample having respective probability and support greater than predetermined minimum values thereof are determined.

Preferably, the computer determines the association rules by constructing a contingency table, each of whose entries corresponds to the number of items in the sample having a given value of the attribute of interest and a given, respective value of another one of the attributes.

There is additionally provided, in accordance with a preferred embodiment of the present invention, a system for determining association rules for prediction of an unknown value of an attribute of interest of a given item from a population of items, each item in the population having a plurality of variable attributes including the attribute of interest, including:

an input device, which receives data indicative of values of attributes of a training sample of items within the population including the attribute of interest;

a memory, which stores the values of the attributes; and a computer, which reads the values from the memory and determines association rules regarding the population, each association rule including one or more conditions on one or more respective attribute values of the items predictive of the value of the attribute of interest, and which stores the association rules in the memory, wherein the computer determines the association rules by constructing one or more contingency tables, each of whose entries corresponds to the number of items in the sample having a given value of the attribute of interest and satisfying a given, respective condition on one or more of the attributes other than the attribute of interest.

Preferably, the one or more contingency tables include a table of 1-conditions, characterized in that the condition on the one or more of the attributes includes a condition on a single one of the attributes. Further preferably, the one or more contingency tables include a table of 2-conditions, characterized in that the condition on the one or more of the attributes includes a condition on two of the attributes, which is constructed by the computer using the table of 1-conditions. Most preferably, the one or more contingency tables include a plurality of respective tables of q-conditions, for a sequence of one or more integers $q \geq 3$, characterized in that for each q, the condition on the one or more of the attributes includes a condition on a group of q of the attributes, wherein for each q, the computer constructs the corresponding table using the table of q-1-conditions previously constructed. Preferably, the computer stores each of the tables of q-conditions in the memory as it is constructed, and for each q, the computer deletes the corresponding table of q-1-conditions from the memory after the table of q-conditions is constructed.

Preferably, the computer encodes values of the attributes according to the frequency of their occurrence in the training sample, preferably by calculating hash functions. Further preferably, the computer assigns a distinguishable code to values occurring at less than a predetermined frequency in the training sample, whereby such values are substantially excluded from the determination the of association rules.

The present invention will be more fully understood from the following detailed description of the preferred embodiments thereof, taken together with the drawings in which:

BRIEF DESCRIPTION OF THE DRAWINGS

FIGS. 5A, 5B an 5C are tables illustrating exemplary data arrays used in the method of FIG. 4, in accordance with a preferred embodiment of the present invention;

FIG. 6 is a table illustrating types of association rules, useful particularly in finding generalized association rules, in accordance with a preferred embodiment of the present invention;

FIG. 7 is a table illustrating types of generalized association rules, which are found using the method of FIG. 1, in accordance with a preferred embodiment of the present invention;

FIG. 8A is a table illustrating a sample database, regarding which association rules are found;

FIG. 8B is a table summarizing generalized association rules found with reference to the database of FIG. 8A, in accordance with a preferred embodiment of the present invention, FIG. 9 is a table summarizing characteristics of simple association rules found with reference to the database of FIG. 8A;

FIG. 10 is a table summarizing characteristics of generalized association rules found with reference to the database of FIG. 8A, in accordance with a preferred embodiment of the present invention.

DETAILED DESCRIPTION OF PREFERRED EMBODIMENTS

Figure 1:
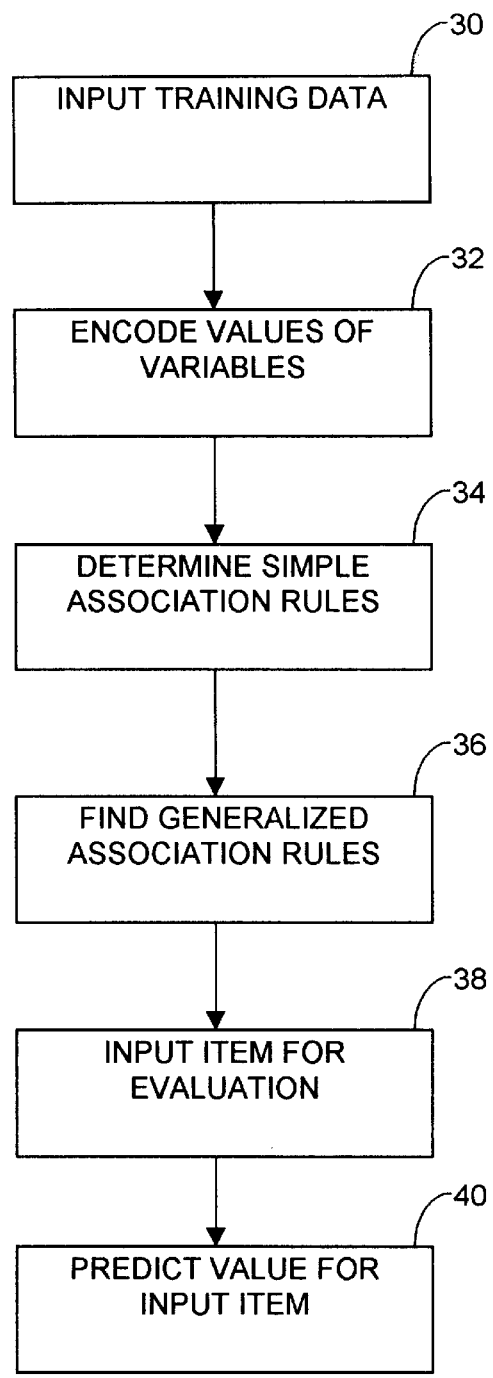
FIG. 1 is a flow chart illustrating a generalized method for data prediction based on pattern recognition, in accordance with a preferred embodiment of the present invention.
Figure 2:
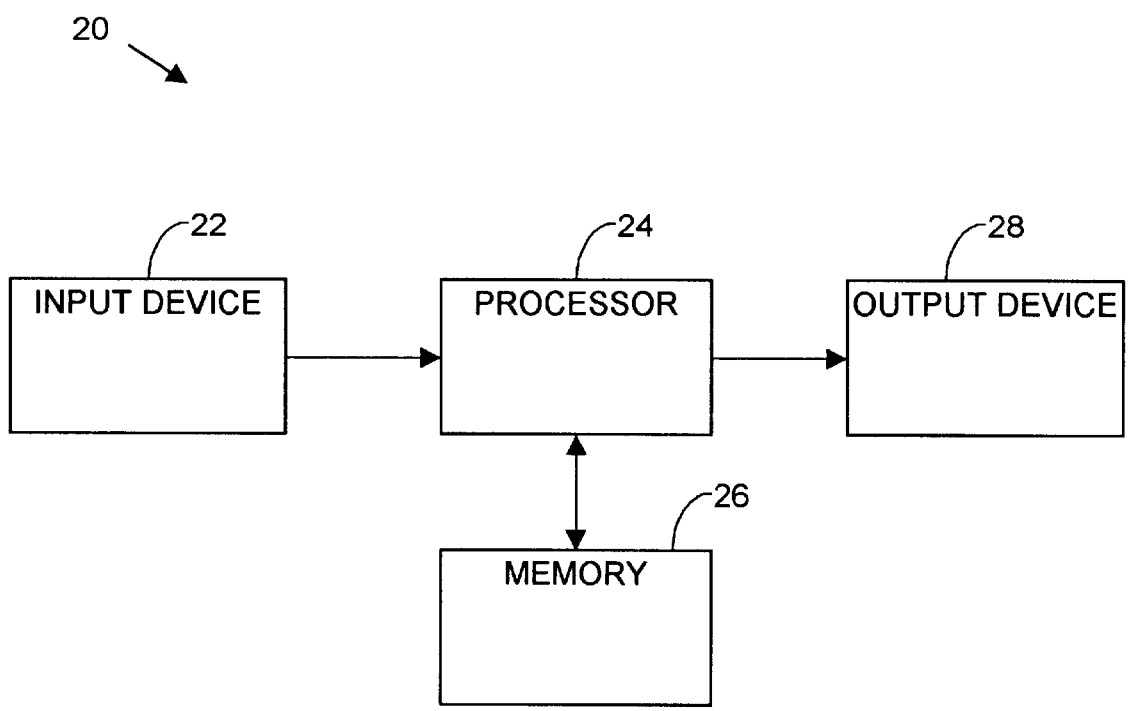
FIG. 2 is a block diagram that schematically illustrates a system for implementing the method of FIG. 1, in accordance with a preferred embodiment of the present invention.

Reference is now made to FIG. 1, which schematically illustrates a generalized method for data prediction, and to FIG. 2, which schematically illustrates a system 20 for carrying out the method, in accordance with preferred embodiments of the present invention.

As shown in FIG. 2, system 20 comprises an input device 22, which receives data relating to a plurality of items in a population and conveys the data to a processor 24, preferably a general purpose computer. Device 22 preferably comprises a keyboard or digital data link, through which database records regarding the items in the population are input to the processor. Alternatively, device 22 may comprise an electronic camera or scanner, for inputting image data; or a microphone, for inputting audio data; or any other suitable type of sensor or other input device known in the art. Although preferred embodiments are described hereinbelow mainly with reference to analysis and prediction of database records, in alternative embodiments of the present invention, system 20 and the method of FIG. 1 may be applied to pattern recognition and prediction on other types of data, as well.

As a first step 30 in the method shown in FIG. 1, processor 24 receives the data from device 22 relative to a training sample within the overall population. Each of the items in the training sample has a known value of a predetermined Field to Predict, y. In step 32, processor 24 then encodes the data regarding the training sample, preferably in a form substantially as given by equation (1), above, and stores the training database thus generated in a memory device 26, such as a magnetic disk. Methods of encoding the data are described in further detail hereinbelow.

Once the training database has been generated and encoded, processor 24 analyzes the database in step 34 to determine all simple association rules having a minimum support $S_{min}$, and minimum admissible probabilities, as defined by a user of system 20. The processor then analyzes the set of simple association rules to find generalized association rules regarding the training database in step 36.

The following is a formal definition of generalized association rules. Let J be the set of numbers of all simple association rules. Let $J_1$ ($J_0$) be the subset of J including all rules with y=1 (y=0) in the "then" part, wherein $J_1, J_0 \subset J$, $J_1 \cup J_0 = J$, and $J_1 J_0 = \emptyset$. Let us denote the condition of rule j (with a single or conjunctive expression in the "if" part) by $C_j^{(1)}$ (if $j \in J_1$) and by $C_j^{(0)}$ (if $j \in J_0$) Consider each $C_j^{(1)}$, $C_j^{(0)}$ as a propositional (logical) variable. $C_j^{(1)}$, $C_j^{(0)}$ will denote that the condition of rule j is fulfilled, and $\neg C_j^{(1)}$ $\neg C_j^{(0)}$ will denote that the condition of rule j is not fulfilled.

We now define a Boolean algebra function $f_1 = f_1(C_{j1}^{(1)}, \ldots, C_{jk}^{(1)})$ of selected k propositional variables $C_{j1}^{(1)}, \ldots, C_{jk}^{(1)}$, wherein $\{j_1, \ldots, j_k\} \subset J_1$. We further define a Boolean algebra function $f_2 = f_2(C_{\hat{j}1}^{(0)}, \ldots, C_{\hat{j}l}^{(0)})$, wherein $\{\hat{j}_1, \ldots, \hat{j}_l\} \subset J_0$. Moreover, we define a Boolean algebra function $f(f_1(C_{j1}^{(1)}, \ldots, C_{jk}^{(1)}), f_2(C_{\hat{j}1}^{(0)}))$ of two propositional variables given by $f_1$ and $f_2$. A generalized association rule is a statement of the kind:

if (the Boolean algebra function of $\{C_j^{(1)}\}$ and/or $\{C_j^{(0)}\}$) then
$y=y_1$              (5)

wherein $y_1=1$ or $y_1=0$, the probability of the rule on the training database is 1, and the support of the rule is not less than $S_{min}$.

Processor 24 selects and applies only those generalized association rules having a clear and intelligible interpretation, which rules are therefore likely to be valid on the overall population to which the training database belongs. An example of such a rule is as follows:

if $\neg C_{j1}^{(1)} \cdot C_{j2}^{(1)} \cdot \ldots \wedge \neg C_{jk}^{(1)}$) then $y=0$        (6)

Methods of determining all of the simple association rules and of finding and selecting the generalized association rules are described further hereinbelow. The rules thus found are preferably stored by processor 24 in memory 26.

Returning to FIG. 1, in step 38, after all the association rules are found, data regarding one or more items having an unknown value of the Field to Predict are input to processor 24, preferably via device 22, and are encoded in similar fashion to the training data. Although in the system of FIG. 2, a single processor is used both to find the association rules and to predict the unknown value, it will be understood that a separate computer could also be used to find the association rules, as described above, which rules are then stored in memory 26 for application by processor 24. The association rules, including the generalized association rules, are applied by processor 24 to the encoded data in step 40, and are used to predict the value of the item's Field to Predict and, preferably, the probability that the prediction is correct.

Processor 24 outputs the predicted value and, optionally, the probability of correctness, via an output device 28. Device 28 preferably comprises a monitor or other data display, but may alternatively comprise an access control device, such as an electronic lock, which allows access responsive to the predicted value; or a sorter, which sorts items according to the predicted value; or a printer, or any other suitable type of output device known in the art. Methods of applying the generalized association rules to predict database fields are described further hereinbelow.

ENCODING OF VARIABLES

Each individual field of the training database is considered to be a qualitative (categorical) or quantitative variable. The variable type is defined by the types of comparisons that can be applied to its values. If only the relations "equal" and "unequal" can be introduced on the set of a variable's values, then such a variable is said to be a qualitative (categorical) variable. Unlike such qualitative variables, the set of values of a quantitative variable has the structure and properties of the axis of real numbers. All alphanumeric data are considered as attributes. Therefore, an attribute can be recognized by definition of the source file when the field is defined as alphanumeric. However, if the field is defined as numeric, it is impossible to ascertain whether the variable is quantitative or qualitative. In this case, the user must state the type of variable corresponding to this field. In the present patent application, we will not distinguish between a categorical and an orderable qualitative variable, wherein an ordered relation between any pair of variable values can be introduced. All such variables are collectively referred to herein as "attributes."

Figure 3:
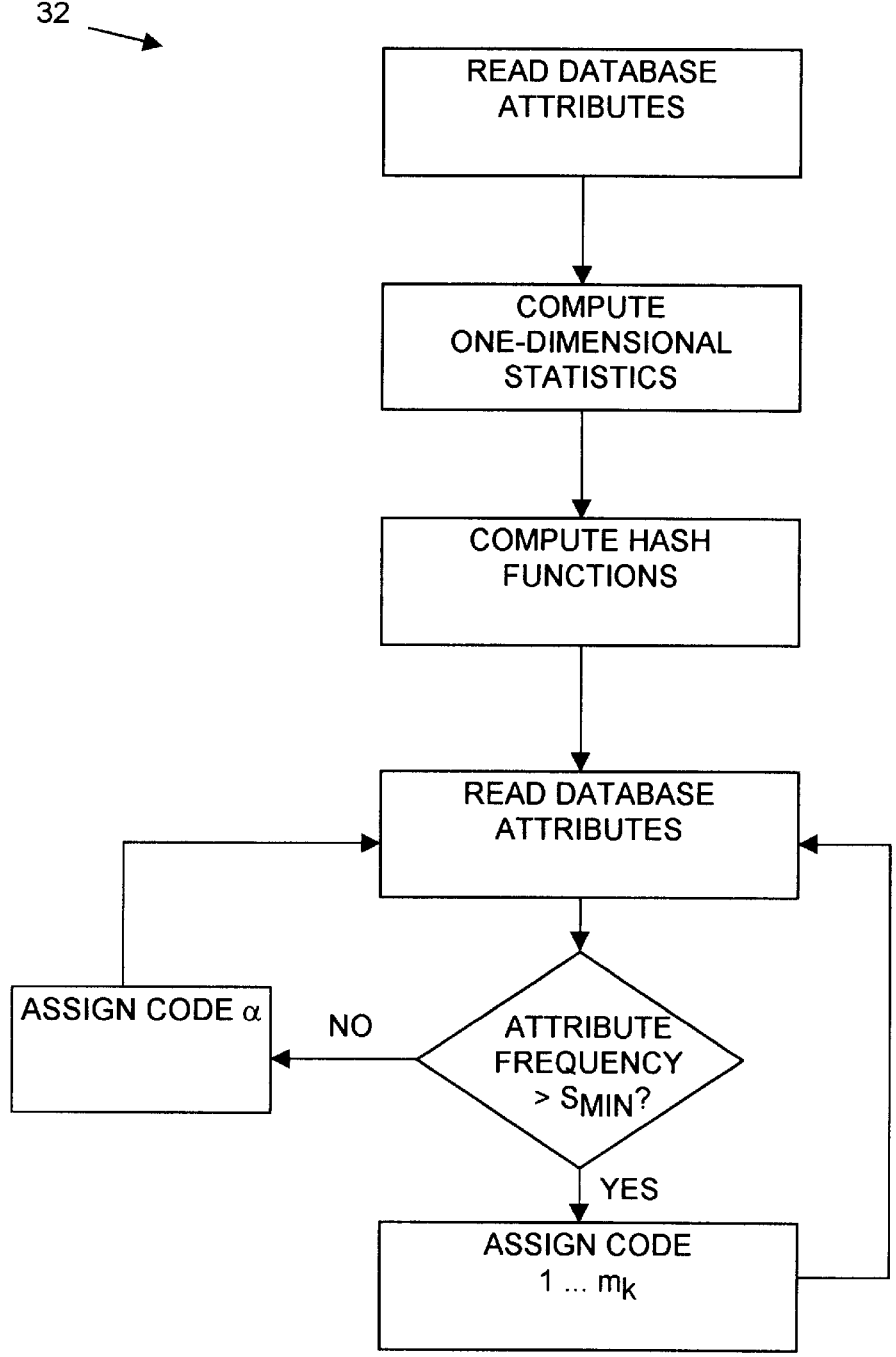
FIG. 3 is a flow chart illustrating a method for encoding values of variables, for use particularly in the method of FIG. 1, in accordance with a preferred embodiment of the present invention.

FIG. 3 is a flow chart that schematically illustrates a method for encoding the values of the variables, corresponding generally to step 32 in FIG. 1, in accordance with a preferred embodiment of the present invention. The method maps the set of a field's values into a virtually minimum possible number of codes necessary for determining all rules of the type given by equation (3), with a support not less than $S_{min}$. The procedure for encoding the attributes' values is based on the use of hash functions and byte-statistics. It requires two readings of an initial training database. A dictionary table listing the correspondence of the codes thus generated to the field values is constructed simultaneously. The method makes use of the fact that attribute values having a frequency less than $S_{min}$ are uninformative, i.e., an association rule containing such a value cannot be established.

During the first reading of the investigated database, one-dimensional statistics are computed for each position (byte) of the values of each attribute. Simultaneously, H hash functions $h_1(\bar{z}^{(k)}), h_2(\bar{z}^{(k)}), \ldots, h_H(\bar{z}^{(k)}), \ldots$, as are known in the art, are calculated for each attribute k, wherein $\bar{z}^{(k)} = (z_1^{(k)}, \ldots, z_{l_k}^{(k)})$ is a vector whose components respectively correspond to the positions (bytes) of attribute k, which is $l_k$ bytes long. The values of functions $h_i(\bar{z}^{(k)})$, $i=1, \ldots, H$ are used as addresses in which the corresponding quantities of records of the investigated database are computed.

During the second reading of the training database, different successive codes are assigned to attribute values whose frequency could be greater than or equal to $S_{min}$. In assigning the codes, using the tables of byte-statistics and the hash tables, the following two statements are applied:

(1) If at least one of the positions (bytes) of the fixed value of any fixed attribute occurs less than $S_{min}$ times in the investigated database, then this attribute value occurs less than $S_{min}$ times too.

(2) If the frequency of at least one of the values $h_1(\bar{z}^{(k)}), \ldots, h_H(\bar{z}^{(k)})$ is less than $S_{min}$, then the value $\bar{z}^{(k)}$ of attribute k occurs less than $S_{min}$ times in the investigated database.

The different successive codes $1, \ldots, m_k$ are thus assigned only to those values of attribute k which have a frequency not less than $S_{min}$ in all the corresponding places in the tables of byte-statistics and in hash tables. Here $m_k$ is the number of different values of attribute k taken into account when searching for association rules. A special code $\alpha$ is assigned to any value of attribute k which has at least one frequency less than $S_{min}$ in the above-mentioned tables, wherein $\alpha$ is preferably an integer sufficiently large such that $m_k < \alpha$ for all k. (For example, $$\alpha = \left[\frac{N}{S_{min}}\right] + 1.)$$

Code 0 is preferably used for encoding missing values (if all $z_i^{(k)}$ are blanks).

Encoding for a quantitative variable is preferably carried out by dividing the set of values of each quantitative variable into nonintersecting intervals. When constructing such intervals for values of the quantitative variable, the corresponding frequency distribution function is analyzed. Intervals having a relatively great density of the variable's values are determined, and successive serial codes are assigned to them. Each detected interval satisfies the condition that the number of values belonging to this interval is not less than $S_{min}$.

Based on the method described above, substantially any data field can be treated as an attribute. The methods described hereinbelow for determining the association rules use substantially only the codes of the values of the fields. For the sake of brevity, such codes are referred to themselves hereinafter, as values.

DETERMINING SIMPLE ASSOCIATION RULES

Figure 4:
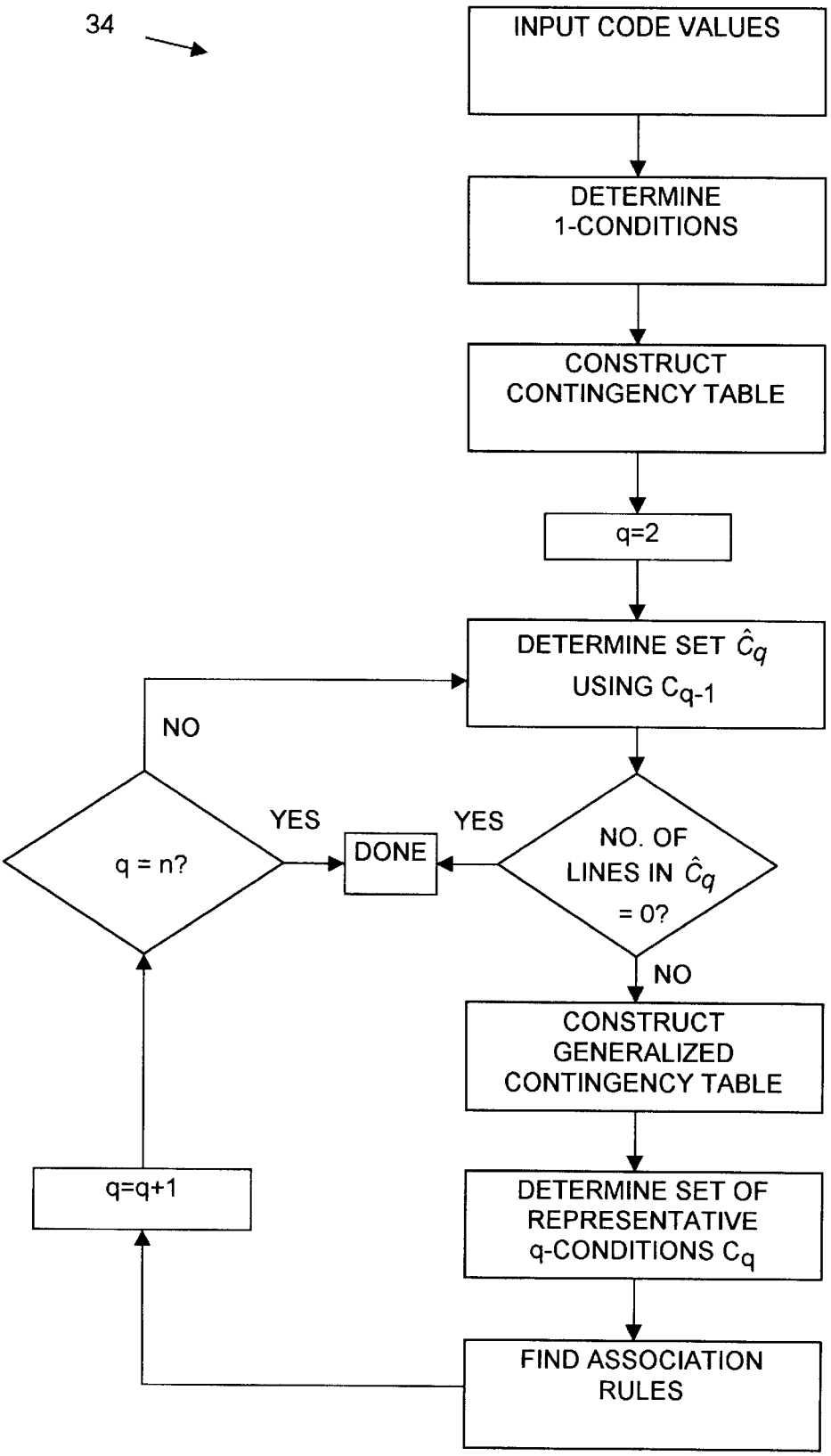
FIG. 4 is a flow chart illustrating a method for determining simple association rules, in accordance with a preferred embodiment of the present invention.

FIG. 4 is a flow chart that schematically illustrates a method for determining all the simple association rules with respect to the training database, corresponding generally to step 34 in FIG. 1, in accordance with a preferred embodiment of the present invention. To determine all association rules with 1-conditions and to construct a set of all representative 2-conditions, contingency tables are used. Then for each value of $q=2, \ldots, n-1$, a set of all potentially representative $(q+1)$-conditions is determined recursively from a set of all representative q-conditions. The set of potentially representative conditions for each value of q is used to determine all of the association rules for that value of q that are actually representative of the data, by applying a generalized contingency table.

A contingency table between attributes $x_{k_1}$ and $x_{k_2}$ is two-dimensional matrix $\|N_{ij}^{(k_1,k_2)}\|$, wherein $N_{ij}^{(k_1,k_2)}$ is a number of records such that $x_{k_1}=i$ and $x_{k_2}=j$. In a general case, if $N_{ij}^{(k_1,k_2)} \geq S_{min}$, $i, j \neq \alpha$, then we get the statement:

If $x_{k_2} j$ then there is a probability $$p = \frac{N_{ij}^{(k_1,k_2)}}{\sum_i N_{ij}^{(k_1,k_2)}} \text{ that } x_{k_1} = i. \tag{7}$$

In the preferred embodiments described herein, the rules of interest are those with field y in the "then" part. Therefore, contingency tables between attributes y and $x_k$, $k=1, \ldots, n$ are constructed. For a given k, let us denote an element of the corresponding contingency table by $N_{ij}^{(k)}$, wherein $i=0,1$. If $N_{1j}^{(k)} \geq S_{min}$ and $N_{1j}^{(k)}/(N_{1j}^{(k)}+N_{0j}^{(k)}) \geq \hat{p}1$, then we obtain the following rule:

if $x_k = j$ then $y=1$

Probability $p=N_{1j}^{(k)}/(N_{1j}^{(k)}+N_{0j}^{(k)})$ support=$N_{1j}^{(k)}$ \hfill (8)

On the other hand, if $N_{0j}^{(k)} \geq S_{min}$ and $N_{0j}^{(k)}/(N_{1j}^{(k)}+N_{0j}^{(k)}) \geq \hat{p}0$, then we obtain the rule:

if $x_k = j$ then $y=0$.

Probability $p=N_{0j}^{(k)}/(N_{1j}^{(k)}+N_{0j}^{(k)})$

Support=$N_{0j}^{(k)}$ \hfill (9)

In this manner all association rules with 1-conditions are discovered.

A q-condition is called representative if a number of records at which this condition is fulfilled is not less than $S_{min}$. The q-condition is called potentially representative if any (q−1)-condition which could be derived from the q-condition is representative, for q>1. It will be appreciated that if the q-condition is representative, then it is necessarily potentially representative, too. Hence, the set of all potentially representative q-conditions contains all representative q-conditions.

Let us denote the set of all representative q-conditions by $C_q$, and the set of all potentially representative q-conditions by $\hat{C}_q$. Set $\hat{C}_q$, as well as $C_q$, is represented as an array (denoted by the same symbols $\hat{C}_q$, $C_q$, respectively), wherein line j describes the jth q-condition. Arrays $\hat{C}_q$ and $C_q$ have q pairs of fields $(k_l, i_l)$, l=1, . . . ,q, wherein $x_{k_l} = i_l$ is the lth single condition in the q-condition. By this construction, $k_{l_1} < k_{l_2}$ for $l_1 < l_2$.

Once array $\hat{C}_q$ has been created for a given q, a two-dimensional matrix $\|N_{ij}\|$ is constructed, wherein $N_{ij}$ is a number of records satisfying the jth q-condition of array $\hat{C}_q$ and at which y=i (i=0, 1). The construction of this matrix is analogous to constructing the contingency table between attributes y and $x_k$. Matrices of the type of $\|N_{ij}\|$ are referred to herein as "generalized contingency tables." If $N_{1j} \geq S_{min}$ and $N_{1j}/(N_{1j}+N_{0j}) \geq \hat{p}_1$, then the following rule applies:

if (the jth q-condition) then y=1

Probability $p = N_{1j}/(N_{1j}+N_{0j})$

Support=$N_{1j}$     (10)

If $N_{0j} \geq S_{min}$ and $N_{0j}/(N_{1j}+N_{0j}) \geq \hat{p}_0$, then we have the rule:

if (the jth q-condition) then y=0

Probability $p = N_{0j}/(N_{1j}+N_{0j})$ support=$N_{0j}$     (11)

The definition of the jth condition is in the jth line of array $\hat{C}_q$. Thus, using the generalized contingency table enables substantially all association rules to be determined for each given q>1.

To construct array $C_2$, a contingency table $\|N_{ij}^{(k_1 k_2)}\|$ between each pair of attributes $x_{k_1}$ and $x_{k_2}$ is computed, for $k_1=1, \ldots, n-1; k_2=k_1+1, \ldots, n$. All pairs $(k_1, i_1)$ and $(k_2, i_2)$ for which $N_{i_1 i_2}^{(k_1 k_2)} \geq S_{min}$ are then recorded in array $C_2$.

For each value of q>1, an array $\hat{C}_q$ is created from array $C_{q-1}$, using a single scan of array $C_{q-1}$. We will denote values of line j of array $C_{q-1}$ by $(k_l[j], i_l[j])$, l=1, . . . ,q−1. Because $k_{l_1}[j] < k_{l_2}[j]$ for $l_1 < l_2$, the lines of $C_{q-1}$ are sorted by a key made up of the sequence of all fields of $C_q-1$. As a result, array $\hat{C}_q$ is sorted automatically.

Since array $C_{q-1}$ is sorted by the first pairs $(k_1, i_1)$ of its fields, a corresponding interval of lines within which each pair of values of $k_1$ and $i_1$ is located in array $C_{q-1}$ is easily determined. Such sorting is facilitated by introduction of a vector $(g_r)$, r=0, 1, . . ., M, of a dimension $$M + 1 = \sum_{k=1}^{n-1} m_k + 1,$$

wherein $m_k$ is the number of encoded values of attribute k. Components of vector $(g_r)$ are computed as follows:

Let $$\hat{m}_{k_1} = \sum_{k=1}^{k_1-1} m_k.$$

(If $k_1=1$, then $\hat{m}_{k_1}=0$.) First, $g_r$ is assigned values $(k_1, i_1)$, wherein $r = \hat{m}_{k_1} + i_1$, $k_1=1, \ldots, n-1$, and $i_1$ and $i_1=1, \ldots, m_{k_1}$. After that, $$\sum_{j=1}^{r} g_j$$

is assigned to $g_r$, r=2, . . . ,M. Now, if $g_r \neq g_{r-}$, then $g_r$ is the number of the last line in array $C_{q-1}$ where a pair of values $(k_1, i_1)$ is located such that $r = \hat{m}_{k_1} + i_1$; Therefore, if $g_r \neq g_{r-}$, then numbers of lines of array $C_{q-1}$ containing values $k_1, i_1$ in the first two columns respectively are located only within an interval $[g_{r-1}+1, g_r]$, with $r = \hat{m}_{k_1} + i_1$. If $g_r = g_{r-1}$, this means that there is no a pair of values $(k_1, i_1)$ in the first two columns of array $C_{q-1}$. Note that vector $(g_r)$ is computed simultaneously with constructing array $C_{q-1}$. The vector enables us not only to speed up retrieval of values from $C_{q-1}$, but also to reduce the number of fields in array $C_{q-1}$ by eliminating the first pair of fields $(k_1, i_1)$.

For each q, array $\hat{C}_q$ is constructed in one scan of array $C_{q-1}$ and one scan of the vector $(g_r)$ relating to $C_{q-1}$. Upon scanning components of vector $(g_r)$, values $r_0$ are found such that $g_{r_0} \neq g_{r_0-1}$. This means that (q−1)-conditions having a first single condition $x_{k_1} = i_1$, wherein $r_0 = \hat{m}_{k_1} + i_1$, are located within an interval $[g_{r_0-1}+1, g_{r_0}]$ of lines of array $C_{q-1}$. For $j = g_{r_0-1}+1, \ldots, g_{r_0}$, the lines of $C_{q-1}$ are scanned. A given line $j_0 \in [g_{r_0-1}+1, g_{r_0}]$ in array $C_{q-1}$ is represented as $(k_2[j_0], i_2[j_0]), \ldots, (k_{q-1}[j_0], i_{q-1}[j_0])$, taking $k_1[j_0]=k_1$ and $i_1[j_0]=i_1$. A value of $r_{10}$ is calculated using $r_1 = \hat{m}_{k_2[j_0]} + i_{2[j_0]}$. If $g_{r_1} = g_{r_1-1}$, this means that there is no line in $C_{q-1}$ with values $(k_2[j_0], i_2[j_0])$ of the first pair of fields $(k_1, i_1)$, and we proceed to the next line $j_0+1$ within interval $[g_{r_0-1}+1, g_{r_0}]$. Otherwise, if $g_{r_1} \neq g_{r_1-1}$, we scan lines of array $C_{q-1}$ within interval $[g_{r_1-1}+1, g_{r_1}]$. For each line $j_1$ belonging to this interval and (for q>3) satisfying the condition:

$(k_2[j_1]=k_3[j_0], i_2[j_1]=i_3[j_0]), \ldots, (k_{q-2}[j_1]=k_{q-2}[j_1], i_{q-2}[j_1]=i_{q-1}[j_0])$ (12)

we find the corresponding $(k_{q-1[j_1]}, i_{q-1}[j_1])$. If there is no such $j_1$ (for q>3), then we proceed to consider the next line $j_0$ 30 1 in array $C_{q-1}$ within interval $[g_{r_0-1}+1, g_{r_0}]$. For q=3, equalities of the type of equation (12) do not exist, and we instead consider each $(k_{q-1}[j_1], i_{q-1}[j_1]) = (k_2[j_1], i_2[j_1])$ for $j_1 \in [g_{r_1-1}+1, g_{r_1}]$.

If a line $j_1$ is found that satisfies equation (12), there may exist a potentially representative q-condition corresponding to:

$(k_1, i_1), (k_2[j_0], i_2[j_0]), \ldots, (k_{q-1}[j_0], i_{q-1}[j_0]), (k_{q-1}[j_1], i_{q-1}[j_1])$ (13)

For the q-condition to exist, it is necessary that all the following q−2 lines within interval $[j_0+1, g_{r_0}]$ exist in array $C_q-1$ (for $k_1, i_1$ such that $r_0 = \hat{m}_{k_1} + i_1$). Each of these lines is formed from the line $(k_2[j_0], i_2[j_0]), \ldots, (k_{q-1}[j_0], i_{q-1}[j_0]), (k_{q-1}[j_1], i_{q-1}[j_1])$ (14)

by deletion of one of pairs $(k_2[j_0], i_2[j_0]), \ldots, (k_{q-1}[j_0], i_{q-1}[j_0])$.

If array $C_{q-1}$ contains all of these lines within interval $[j_0+1, g_{r_0}]$, then the q-condition given by equation (13) is recorded in the current line of array $\hat{C}_q$. Simultaneously, the number of q-condition recorded in array $\hat{C}_q$, which were constructed from lines within the interval $[g_{r_0-1}30\ 1, g_{r_0}]$ of array $C_{q-1}$, is computed in component $g_{r_0}$ of the vector $(g_r)$, relating to $\hat{C}_g$. This construction gives the sorted array $\hat{C}_q$. FIGS. 5A–5C are tables illustrating calculation of an array $\hat{C}_3$ (FIG. 5C) of 3-conditions, from array $C_2$ (FIG. 5A) of 2-conditions on a sample training database, using auxiliary vectors $(\hat{m}_{k_1})$ and $(g_r)$ (FIG. 5B), in accordance with the method described hereinabove.

There are n=6 input fields in the training database, and the set of codes of values for each of input fields $x_k, k=1, \ldots, 6$, is taken to be {1,2,3}. Assume that we have found the set $C_2$ of all representative 2-conditions presented in FIG. 5A. The first pair of fields $(k_1, i_1)$ of array $C_2$ is not saved, and it is given for information only. Instead of this pair of fields, auxiliary vectors $(\hat{m}_{k_1})$ and $(g_r)$ are used.

Vector $(g_r)$ is constructed in the process of creating array $C_2$, as described above. In FIG. 5B, the line above $(g_r)$ illustrates the process of the construction of $(g_r)$, wherein the frequency of each pair of values $(k_1, i_1)$ is first computed. For example, the frequency of pair (2,3) is 2, and it is recorded in $(g_r)$ as the component with index $r=\hat{m}_2+3=6$.

Let us construct array $\hat{C}_3$ from $C_2$. Vector $(g_r)$ shows that the first pair of $(k_1, i_1)$ is (1,1), and it belongs to the interval $[0+1,3]=[1,3]$ of the lines of $C_2$. Now, for $(k_2[1], i_2[1])=(2, 1)$, $r=\hat{m}_{k_2[1]}+i_2[1]=\hat{m}_2+1=4$. This means that the pair (2, 1) of fields $(k_1, i_1)$ is located within interval of lines $[g_3+1, g_4]=[6, 6]$. In line 6 of $C_2$, $(k_2[6], i_2[6])=(3, 1)$. Pair (3,1), however, does not exist among pairs $(k_2[j], i_2[j])$ for $j=2, 3$.

In the next line in the interval [1,3], line 2, $(k_2[2], i_2[2])=(3, 2)$. For these values, $r=\hat{m}_3+2=8$, so that pair (3,2) of fields $(k_1, i_1)$ is located within the interval of lines $[g_7+1, g_8]=[10, 10]$. In line 10 of $C_2$ $(k_2[10], i_2[10])=(4, 1)$. Similarly, $(k_2[3], i_2[3])=(4, 1)$, so that the 3-condition {(1, 1),(3,2),(4,1)} is potentially representative, and it is recorded in array $\hat{C}_3$. Continuing in such a way to scan array $C_2$, we find no other potentially representative 3-conditions.

After array $\hat{C}_q$ for a given q has been created, a generalized contingency table between output attribute y and the set of lines of array $\hat{C}_q$ is constructed in order to determine all the simple association rules based on q-conditions. Simultaneously, q-conditions having a frequency less than $S_{min}$ are detected and deleted from array $\hat{C}_q$ as it is transformed into $C_q$. Then array $\hat{C}_{q+1}$ is constructed from $C_q$, and so on.

After creation of array $\hat{C}_{q+1}$ and finding all simple association rules for a given q, array $C_q$ is not further required, and therefore, it is preferably deleted to reduce the demand on memory 26. Typically, the number of lines in array $C_q$ rapidly decreases relatively to the number in array $C_{q-1}$ beginning with q=4 or q=5. The condition for terminating the procedure is an absence of lines in array $\hat{C}_g$ when constructing the array from $C_{q-1}$, or q=n.

FINDING GENERALIZED ASSOCIATION RULES

As described above, a generalized association rule (also referred to hereinafter as a "generalized rule") is a determinate statement of the value of the Field to Predict given generally by equation (5). After all the simple association rules (also referred to hereinafter as "simple rules" or simply as "rules") are determined, they are used to find such generalized rules, as indicated by step 36 in FIG. 1. There are a number of types of generalized rules, which are found in accordance with preferred embodiments of the present invention as described hereinbelow.

Reference is now made to FIG. 6, which is a table illustrating a matrix C, containing a classification of simple rules according to a set of numbers of records I in the database and a set of numbers of simple rules applying thereto J, which are preferably determined in accordance with the methods described hereinabove. $J_1$ denotes the subset of J containing all rules with y=1 in the "then" part. The subset of numbers of rules with y=0 is denoted by $J_0$. $J_1 \cup J_0 = J$, $J_1 \cap J_0 = \emptyset$. The condition of rule j (the expression in the "if" part of the rule) is considered as a propositional variable and denoted by $C_j^{(1)}$ (if $j \in J_1$) and $C_j^{(0)}$ (if $j \in J_0$). We further denote the subset of numbers of records with y=1 (y=0) by $I_1(I_0)$ respectively. $I_1, I_0 \subset I$, $I_1 \cup I_0 = I$, $I_1 \cap I_0 = \emptyset$.

Matrix C is given by $C = \|c_{ij}\|$, $i \in I$, $j \in J$, wherein $c_{ij}=1$ if the condition of rule j is fulfilled at record i; and otherwise, $C_{ij}=0$. Matrix C serves as input data for finding generalized rules. Without loss of generality and for the sake of simplicity, we represent matrix $C = \|c_{ij}\|$ with its rows ordered by Field to Predict value, and any rule number $j \in J_1$ is less than any $j \in J_0$.

As shown in FIG. 6, matrix C may be divided into four quadrants, marked I through IV. Quadrant I, for example, contains all $c_{ij}$ for $i \in I_1, j \in J_1$. From the definition of association rules, it follows that the relative density of 1's in quadrants I and IV is greater than in quadrants II and III, respectively. For any given column j of matrix C, corresponding to a rule $j \in J_1$ with support s and probability p, the relative frequency of 1's in quadrant I is $$p_I = \frac{s}{p_a N},$$

whereas in quadrant II it is $$p_{II} = \frac{s(1-p)}{pN(1-p_a)}.$$

pI>pII, since by the definition of set $J_1$, $p \geq \hat{p}_1 > p_a$. (Here, as previously, $p_a$ is the a priori probability that y=1, and $\hat{p}_1$ is the minimum admissible probability for a rule with y=1.) Note that if $p >> p_a$, then $p_I >> p_{II}$. Analogously, based on the definition of set $J_0$, it will be appreciated that for a rule $j \in J_0$, the relative frequency of 1's in quadrant IV is greater than in quadrant III.

This property of matrix C is used in finding the generalized rules. Although in the preferred embodiments described herein, C is limited to four quadrants by our definition of y as Boolean, it will be appreciated that C may be generalized to encompass variables of other types, as well.

FIG. 7 is a table that illustrates a classification of generalized association rules into four different types, in accordance with a preferred embodiment of the present invention. Each type is derived from the simple association rules, preferably using methods described hereinbelow.

Type 1. The number of association rules determined is usually great, and on average, there are many relevant rules for each record of the training database. In terms of matrix $C = \|c_{ij}\|$, this means that there are, on average, many 1's in each line i. Let us assume that for each line $i \in I_1$, there is at least one $c_{1ij}=1$, $j \in J_1$. Thus, all of the rule conditions $j \in J_1$, taken in aggregate, "cover" all the records that have y=1. But at the same time, this aggregate of rules may cover almost all or even all records with y=0, since only the rules $j \in J_1$ having a probability of 1 "cover" only relevant records $i \in I_1$ and do not cover any records with $i \in I_0$. It would be desirable to select a small number of rules $j \in J_1$ such that together they cover all records $i \in I_1$ and a minimal number of records $i \in I_0$. Then for each "uncovered" record, it can be stated definitively that this record belongs to set $I_0$, i.e., there is a probability of 1 that y=0.

Formally, assume that we have found the subset of rules $\{j_1, \ldots, j_k\} \subset J_1$ such that $\{i \in I_1 | \exists j \in \{j_1, \ldots, j_k\} \ c_{ij} 1\} = I_1$. This means that we have found a generalized rule of type 1, as shown in FIG. 7. The support of this generalized rule is equal to the number of records at which none of rules $j_1, \ldots, j_k$ is fulfilled. As described above, to establish the rule it is necessary that the rule's support be not less than $S_{min}$. Note that the condition of the generalized rule thus found can be written in the following equivalent form:

$$\neg C_{j1}^{(1)} \hat{\ } \neg C_{j2}^{(1)} \hat{\ } \ldots \hat{\ } \neg C_{jk}^{(1)} \quad (15)$$

It will thus be understood that the association rules predicting value y=1 of the Field to Predict with a probability greater than the a priori one, taken in aggregate, identify records having y=0 with a maximal level of confidence.

In a preferred embodiment of the present invention, to find a generalized rule of type 1, we solve a covering problem formulated as follows: A vector of Boolean variables $\hat{z}=(z_j)$, $j \in J_1$ is introduced, wherein $z_j=1$ if the condition of rule j is entered in the subset of conditions to be found; and otherwise $z_j=0$. In order to find the generalized rule, the minimum of a functional $F(\hat{z})$ is found:

$$F(\hat{z}) = \sum_{i \in I_0} \text{sign}\left(\sum_{j \in J_1} c_{ij} z_j\right) \quad (16)$$

subject to $$\sum_{j \in J_1} c_{ij} z_j \geq 1, i \in I_1 \quad (17)$$

$$z_j \in \{0, 1\}, j \in J_1 \quad (18)$$

Here sign (x)=1 if x>0; and sign (x)=0 if x=0.

Assuming $\hat{z}^{(o)}=(z_j^{(o)})$ to be the optimal solution of equations (16)–(18), then the subset $\{j_1, \ldots, j_k\}$ of numbers of rules such that $z_{jl}^{(o)}=1$, $l=1, \ldots, k$ defines the aggregate of conditions $\{C_{j1}^{(1)}, \ldots, C_{jk}^{(1)}\}$ to be used in the generalized rule of type 1.

The optimization criterion minimizing the functional of equation (16) is equivalent to maximizing the support of the generalized rule of type 1 to be found. Therefore, to solve equations (16)–(18), rules having a large support and a large probability that y=1 should be chosen. The rules should be incompatible with or independent of one other on subset $I_1$ of the database records and simultaneously (if possible) should be dependent on subset $I_0$.

Preferably, all generalized, mutually independent rules of type 1 are found. The independence of generalized rules is understood as follows: Assume that L generalized rules of type 1 have been found. Let $J_1^{(l)}$ be the subset of numbers of rules whose conditions are entered in the lth generalized rule, $J_1^{(l)} \subset J_1$, $l=1, \ldots, L$. These generalized rules are considered independent if $$\bigcap_{l=1}^{L} J_1^{(l)} = \emptyset,$$

i.e., there is no simple rule entered in more than one generalized rule of type 1.

Independent generalized rules are preferably found by solving another covering problem relative to the lth such generalized rule (l>1), wherein the minimum of the following functional $F(\hat{z})$ is found:

$$F(\hat{z}) = \sum_{i \in I_0} \text{sign}\left(\sum_{j \in J_1 \setminus \hat{J}_1^{(l-1)}} c_{ij} z_j\right) \quad (19)$$

subject to $$\sum_{j \in J_1 \setminus \hat{J}_1^{(l-1)}} c_{ij} z_j \geq 1, i \in I_1 \quad (20)$$

$$z_j \in \{0, 1\}, j \in J_1 \setminus \hat{J}_1^{(l-1)} \quad (21)$$

wherein $$\hat{J}_1^{(l-1)} = \bigcup_{l_1=1}^{l-1} J_1^{(l_1)}.$$

It will be appreciated that equations (16)–(18) represent a special case of equations (19)–(21), for $\hat{J}_1^{(0)}=\emptyset$ and l=1.

Before solving the lth model of the type given by equations (9)–(21), the condition for existence of a solution is verified. This condition is formulated as follows: that the number of records belonging to a set $\{i \in I_1 | \exists j \in J_1 \setminus \hat{J}_1^{(l-1)} \ c_{ij}=1\}$ is equal to the total number of records with y=1 in the training database. In other words, the condition is $\{i \in I_1 | \exists j \in J_1 \setminus \hat{J}_1^{(l-1)} \ c_{ij}=1\}=I_1$. If this condition is not fulfilled, the search for generalized rules of type I is terminated.

Each generalized rule of type 1 is associated with to a certain subset of records for which y=0. Let us denote the subset of records associated with (i.e., satisfying the condition of) the lth generalized rule of type 1 by $I_0^{(l)}$. A number $\tilde{s}_l$ of records $i \in I_0^{(l)}$ constitute the support of the lth generalized rule. To establish the rule, it is necessary that $\tilde{s}_l > S_{min}$. Since the optimization criterion of equation (19) is equivalent to maximization of the support of the generalized rule, such generalized rules typically have $\tilde{s}_l >> S_{min}$.

The lth generalized rule of type 1, having the set of conditions $\{C_{j1}^{(1)}, \ldots, C_{jk}^{(1)}\}$, wherein $J_1^{(l)}=\{j_1, \ldots, j_k\}$ is the optimal solution of lth set of equations (19)–(21), thus states that on the set $I_0^{(l)}$ of records satisfying none of conditions $C_{j1}^{(1)}, \ldots, C_{jk}^{(1)}$ the Field to Predict y=0. Any rule or rules $j \in J_1 \setminus \hat{J}_1^{(l)}$ whose conditions are fulfilled only on the set of records $I \setminus I_0^{(l)}$ can be added to the set $\{C_{j1}^{(1)}, \ldots, C_{jk}^{(1)}\}$. The numbers of such rules are then entered in set $J_1^{(l)}$. The addition of such conditions does not change set $I_0^{(l)}$ of records corresponding to the lth generalized rule, and therefore, it has no effect on the prediction results of the generalized rule on the training database. It reinforces, however, the aggregate condition of the lth generalized rule, and consequently, increases confidence in the accuracy of prediction when the generalized rules are applied to predict y for records (items) in the overall population outside the training database. It may be that the number of records in the overall population corresponding to this generalized rule will be slightly decreased.

The choice of the above-mentioned additional conditions from set $J_1 \backslash \hat{J}_1^{(l)}$ guarantees the independence of the generalized rules thus found (in the sense of the definition given above). An excessive number of conditions in a generalized rule may, however, decrease the possibilities for finding subsequent independent generalized rules of this type. This possible disadvantage is preferably overcome by permitting slightly dependent generalized rules. In this case, the above-mentioned additional conditions, fulfilled only on the set of records $I \backslash I_0^{(l)}$, are selected from set $J_1 \backslash J_1^{(l)}$.

In accordance with preferred embodiments of the present invention, the criterion defined by equation (19) is used to find each set $I_0^{(l)}$ in a way that maximizes the accuracy of prediction on the overall population. If the same records are covered by different independent generalized rules predicting the same value of y, there will be a high level of confidence in the prediction accuracy for these records. Records belonging to the intersection of multiple sets $I_0^{(l)}$, l=1, . . . , L (if it is non-empty) have a maximal number of corresponding generalized rules.

It is generally sufficient to have approximately five independent generalized rules predicting the same value of y, to be sure of the prediction accuracy. Therefore, if generalized rules of type 1 are found with strongly intersecting sets $I_0^{(l)}$, but there are other records belonging to $I_0$ for which such rules have not been found, then beginning at some stage (for example, from l=6), a modified optimization criterion is preferably used in place of equation (19), minimizing the value of the functional:

$$F(z) = i \in I_0 \backslash \left( \bigcup_{l_1=1}^{\Sigma_{l-1}} I_0^{(l_1)} \right) \text{sign} \left( \sum_{j \in J_1 \cup \overline{J}_1^{(l-1)}} c_{ij} z_j \right) \quad (22)$$

Generalized rules are thus found corresponding to records having y=0 with greater uniformity.

Type 2. Generalized rules of type 2 are preferably found in a manner analogous to that described above for finding generalized rules of type 1. The lth independent generalized rule of type 2 is thus found by finding the minimum of $$F(\bar{z}) = \sum_{i \in I_1} \text{sign} \left( \sum_{j \in J_0 \cup \overline{J}_0^{(l-1)}} c_{ij} z_j \right) \quad (23)$$

subject to $$\sum_{j \in J_0 \cup \overline{J}_0^{(l-1)}} c_{ij} z_j \geq 1, i \in I_0 \quad (24)$$

$$z_j \in \{0, 1\}, j \in J_0 \backslash \hat{J}_0^{(l-1)} \quad (25)$$

wherein $$\overline{J}_0^{(l-1)} = \bigcup_{l_1=1}^{l-1} \hat{J}_0^{(l_1)};$$

$\hat{J}_0^{(0)} = \emptyset$; $\hat{J}_0^{(l_1)}$ is the subset of numbers of rules belonging to set $J_0$ whose conditions are entered in the $l_1$th generalized rule of type 2.

Each generalized rules of type 2 corresponds to a subset of records at which y=1, based on simultaneous nonfulfilment of conditions of selected rules predicting y=0.

Types 3 and 4. To define a generalized rule of type 3, consider an lth generalized rule of type 1, with a set $I_0^{(l)}$ of records satisfying the condition $\neg(C_{j1}^{(1)} C_{j2}^{(1)} v \ldots v C_{jk}^{(1)})$ of this generalized rule. For records $i \in I_0^{(l)}$, the value of the Field to Predict is known to be y=0. An optimal covering of all records remaining in set $I_0$ is then found using rules selected from set $J_0$, wherein $\{j_{k+1}, \ldots j_K\} \subset J_0$ is the subset containing the numbers of the selected rules. Records not covered belong to set $I_1$, containing solely records with y=1. Thus, a generalized rule of type 3 is defined, as shown in FIG. 7.

Type 3 generalized rules are preferably found by solving the covering problem of finding the minimum of.

$$F(z) = \sum_{i \in I_1} \text{sign} \left( \sum_{j \in J_0} c_{ij} z_j \right) \quad (26)$$

subject to $$\sum_{j \in J_0} c_{ij} z_j \geq 1, i \in I_0 \backslash I_0^{(l)} \quad (27)$$

$$z_j \in \{0, 1\}, j \in J_0 \quad (28)$$

The condition for existence of a solution to equations (26)–(28) is that $\{i \in I_0 \backslash I_0^{(l)} | \exists j \in J_0 \ c_{ij}=1\}=I_0 \backslash I_0^{(l)}$, for a subset $I_0^{(l)}$ defined by the lth generalized rule of type 1. Uniting the corresponding generalized rules of type 1 and 3, we obtain the following statement:

if $\neg(C_{j1}^{(1)} v C_{j2}^{(1)} v \ldots v C_{jk}^{(1)})$ then y=0 else if $\neg(C_{jk+1}^{(0)} v C_{jk+2}^{(0)} v \ldots v C_{jK}^{(0)})$ then y=1 (29)

In a manner analogous to finding the generalized rules of type 3, a corresponding generalized rule of type 4 can be found for each generalized rule of type 2. If $I_1^{(l)} \supset I_1$ is the subset of records corresponding to the lth generalized rule of type 2, then the generalized rule of type 4 can be found by determining an optimal covering of records $i \in I_1 \backslash I_1^{(l)}$ using the selected subset of rules belonging to set $J_1$.

The joint statement of corresponding generalized rules of type 2 and 4 is then:

if $\neg(C_{j1}^{(0)} C_{j2}^{(0)} v \ldots v C_{jk}^{(0)})$ then y=1 else if $\neg(C_{jk+1}^{(1)} v C_{jk+2}^{(1)} v \ldots v C_{jK}^{(1)})$ then y=0 (30)

In some cases, a complete covering of records $i \in I_1$ by rules $j \in J_1$ may not exist, since there may be a small subset $\tilde{I}_1 \subset I_1$ of records at which no rule $j \in J_1$ is fulfilled, $\tilde{I}_1 \{i \in I_1 | \forall j \in J_1 \ c_{ij}=0\}$. In this case, a generalized rule of type 1 cannot be found, but a generalized rule of type 4 (and even several independent such rules) may exist.

A method is now described for finding an optimal covering of records $i \in I_1 \backslash \tilde{I}_1$ by a selected subset $\{C_{jk+1}^{(1)}, \ldots, C_{jK}^{(1)}\}$ of rules belonging to set $J_1$, in accordance with a preferred embodiment of the present invention. Let $I_0^{(1)} \subset I_0$ be the subset of "uncovered" records with y=0. For an "uncovered" record, there is a probability of $$p = \frac{|I_0^{(1)}|}{|I_0^{(1)}| + |\tilde{I}_1|}$$

that y=0, wherein the symbol |I| designates the number of records in set I. When $\tilde{I}_1 \neq \emptyset$, a generalized rule of type 4 is sought if $|\tilde{I}_1|$ is relatively small, as defined by $|\tilde{I}_1| \leq r |I_1|$, wherein r is a predetermined constant (for example, r=0.05). If, as desired, subset $I_0^{(1)}$ is relatively large, then the above-mentioned probability p will be close to 1. To find a generalized rule with probability p=1, however, it is necessary to find the rules that enable us to distinguish between subsets $\tilde{I}_1$ and $I_0^{(1)}$.

To define a generalized rule of type 4, we find the covering of records $i \in I_0^{(1)}$ by rules selected from subset $J_0 \backslash \hat{J}_0$, wherein $\hat{J}_0 = \{j \in J_0 | \exists i \in \tilde{I}_1 \ c_{ij}=1\}$. In other words, when searching for this covering, rules having $c_{ij}=1$ on subset $\tilde{I}_1$ of records are excluded from consideration. The generalized rule of type 4 may then include rules $C_{j1}^{(0)}, \ldots, C_{jk}^{(0)}$.

The generalized rule of type 4 is preferably found by solving to find the minimum of:

$$F(\bar{z}) = \sum_{i \in I_0} \text{sign}\left(\sum_{j \in J_1} c_{ij} z_j\right) \quad (31)$$

subject to $$\sum_{j \in J_1} c_{ij} z_j \geq 1, \ i \in I_1 \backslash \tilde{I}_1 \quad (32)$$

$$z_j \in \{0, 1\}, \ j \in J_1 \quad (33)$$

Taking $\hat{z}^{(o)} = (z_j^{(o)})$, $j \in J_1$ to be the optimal solution of equations (31)–(33), the subset $\{j_{k+1}, \ldots j_K\} = \{j \in J_1 | z_j^{(o)} 1\}$ of corresponding rules is used to find the subset $I_0^{(1)}$ of records satisfying the condition $\neg(C_{jk+1}^{(1)} \vee C_{jk+2}^{(l)} \vee \ldots \vee C_{jK}^{1})$. Then the minimum of the following functional is found:

$$F(\bar{z}) = \sum_{j \in J_0 \backslash \hat{J}_0} (\beta - p_j) z_j \quad (34)$$

subject to $$\sum_{j \in J_0 \backslash \hat{J}_0} c_{ij} z_j \geq 1, \ i \in I_0^{(1)} \quad (35)$$

$$z_j \in \{0, 1\}, \ j \in J_0 \backslash \hat{J}_0 \quad (36)$$

wherein $p_j$ is the probability of rule j; and $\beta > 1$ is a constant described hereinbelow, for example, $\beta=1.1$. The desired subset of rules for finding the generalized rule of type 4 is $\{j_1, \ldots j_k\} = \{j \in J_0 \backslash \hat{J}_0 | z_j^{(o)} = 1\}$, wherein $\hat{z}^{(o)} = (z_j^{(o)})$ is the optimal solution of equations (34)–(36).

Covering subset $I_0^{(1)}$ of the records by a minimum number of rules belonging to $J_0 \backslash \hat{J}_0$ could be accomplished by minimization of the functional:

$$\sum_{j \in J_0 \backslash \hat{J}_0} z_j \quad (37)$$

This criterion would give an accurate prediction on the training database. But to make predictions for the overall population, the generalized rule must be as stable as possible.

In a preferred embodiment of the present invention, assuming a generalized rule of type 4 has been found, then for each record $i \in I_0^{(1)}$, we use this rule to predict y=0, based on two factors:

1) none of conditions $C_{jk+1}^{(1)}, \ldots, C_{jK}^{(1)}$ is fulfilled; and
2) at least one of conditions $C_{j1}^{(0)}, \ldots C_{jk}^{(0)}$ is fulfilled. Preferably, a subset of rules $\{C_{j1}^{(0)}, \ldots, C_{jk}^{(0)}\}$ is found such that both of the above-mentioned factors are not fulfilled for a maximum number of records belonging to subset $I_1 \tilde{I}_1$ (i.e., at which y=1). The first factor is not fulfilled for records $i \in I_1 \backslash \tilde{I}_1$ of the training database in accordance with equation (32), and this fact is sufficient to preclude making an erroneous prediction. In order to increase the stability of the generalized rule on future data from the overall population, it is necessary to find rules corresponding to set $I_0^{(1)}$ of records with a high probability that y=0.

In one preferred embodiment, this purpose is achieved by solving a weighted covering problem with a minimized criterion:

$$\sum_{j \in J_0 \backslash \hat{J}_0} (1 - p_j) z_j \quad (38)$$

The drawback of criterion (38) is that it does not change its value when rules with $p_j=1$, covering a small subset of $I_0^{(1)}$, are entered in a solution. Note that criterion (34) is equal to criterion (38) when $\beta=1$.

Preferably, to overcome the above-mentioned drawback of criterion (38), we slightly increase the value of coefficient $\beta$ in equation (34), most preferably to $\beta=1.1$, based on empirical examination, corresponding to the weighted sum of criteria (37) and (38) when the ratio of their weights is 1:10. A more precise approach is to take the value of coefficient $\beta$ according to a predetermined function of a priori probability that the Field to Predict possesses the value predicted by the generalized rule to be found. (For type 4, this value is y=0.)

In a preferred embodiment of the present invention, analogously to finding independent generalized rules of type 1, a plurality of independent generalized rules of type 4 are found by sequentially excluding generalized rules of this type found previously. The number of records in the initial subset $\tilde{I}_1$ will increase with each new generalized rule of type 4 that is found. The condition for terminating the search for such rules is when $|\tilde{I}_1| > r|I_1|$, wherein r is defined above.

In an analogous way, generalized rules of type 3 are found, when there is relatively small subset $\tilde{I}_0 = \{i \in I_0 | \forall j \in J_0 \ c_{ij} 0\}$ of records at which no rule $j \in J_0$ is fulfilled.

FIGS. 8A and 8B are tables illustrating the derivation of generalized association rules on a sample training database, using the principles described hereinabove, in accordance with a preferred embodiment of the present invention. The training database consists of 20 records and contains the Boolean Field to Predict y. y=1 for the first 6 records of the database, and y=0 for the remaining 14 records. Thus, the a priori probability $p_a$ that y=1 is 0.3. Assume that the minimum support $S_{min}$ is 2, and the minimum admissible probabilities are $\hat{p}_1=0.4$ (for a rule with y=1 in the "then" part) and $\hat{p}_0=0.8$ (for a rule with y=0). Assume that 12 association rules have been found. The first 6 rules are formulated as follows: if $C_j^{(1)}$ then y=1, j=1, . . . ,6, with probability 0.4, and support 2. The remaining 6 rules are formulated as follows: if $C_j^{(0)}$ then y=0, j=7, . . . ,12, with probability 0.8, and support 4.

FIG. 8A illustrates matrix $C=\|c_{ij}\|$, i=1, . . . ,20; j=1, . . . ,12, representing the training database, as described above. For the sake of convenience, blanks in the table represent $c_{ij}=0$. The corresponding values of the Field to Predict are adduced in the last column of the table.

FIG. 8B summarizes the generalized rules that are found with regard to the training database. Although the simple association rules determined within the training database are relatively "weak" and few in number, the generalized rules found on the basis of these simple rules cover all the records of the training database with substantially greater accuracy than do the simple rules themselves.

Prediction of Values

In preferred embodiments of the present invention, the generalized association rules determined as described hereinabove are applied to predict one or more attributes of items in the overall population, as given at step 38 of the method shown in FIG. 1. The values of at least some of input fields $x_1, \ldots, x_n$, are given for one or more of the items in the overall population, i.e., records in the database. Based on the generalized rules, optionally supplemented by the simple association rules, the value of the unknown Field to Predict y is predicted, as given at step 40 in the figure. The prediction result cannot be deterministic, but is rather probabilistic. Preferably, not only is the value of y predicted, but also a probability p that the Field to Predict possesses this value. 1−p can be interpreted as the error probability of the prediction.

In methods of pattern recognition and prediction known in the art, prediction of unknown values is carried out on the basis of simple association rules determined on the training database. The inventors have discovered that generalized association rules, which are found as described herein, enable unknown fields to be predicted with greater confidence than is generally possible with simple rules alone. However, the techniques of coding variables and determining simple association rules in accordance with the principles of the present invention, as described hereinabove, may also be used advantageously in prediction using simple association rules.

To demonstrate such methods of prediction in the context of the present invention, let $\{k_1, \ldots, k_Q\}$ be the subset of set $\{1, \ldots, n\}$ of numbers of input fields whose given values are to be used in prediction. The values of $k_1, \ldots, k_Q$ are encoded substantially as described above in reference to the training database (i.e., the method of encoding used when searching for association rules), to give encoded values $\hat{x}_{k_1}, \ldots, \hat{x}_{k_Q}$ of the given variables $x_{k_1}, \ldots, x_{k_Q}$, respectively. In thi vector which we call the prediction Q-condition is determined:

$$\{(k_1, \hat{x}_{k_1}), \ldots, (k_Q, \hat{x}_{k_Q})\} \qquad (39)$$

wherein $k_{l_1} < k_{l_2}$ for $l_1 < l_2$. The vector includes Q pairs, each pair consisting of the number of a given field and its given value. In particular, if values of all the input fields are given, this is the prediction n-condition.

An association rule containing the q-condition in the "if" part is considered relevant to the prediction Q-condition if the set of components of the q-condition is a subset of the set of components of the prediction Q-condition, and if there does not exist a relevant rule with a $q_1$-condition ($q_1>q$) containing all the components of the q-condition. For example, assume that the prediction Q-condition contains both the conditions $x_1=3$ and $x_2=1$, and there are association rules:

(a) if $x_1=3$, then there is probability of $p_1$ that y=1; and (b) if $x_1=3$ and $x_2=1$, then there is probability of $p_2$ that y=1.

In this case, only rule (b) is relevant. Rule (a) is not relevant since there exists a relevant rule (b) whose condition contains the condition of rule (a). Note that if in the prediction Q-condition, $x_2$ was equal to 2, then only rule (a) would be relevant.

In the example of FIG. 8A, for each record i, the rules j for which $c_{ij}=1$ are considered relevant. Thus, for instance, rules 1, 5, 10 are relevant to record 1.

To make a prediction on the basis of relevant association rules, all association rules are formulated so that they contain the same predicted value of the Field to Predict (say y=1) in the "then" parts. For this purpose, probability $p_j$ of any rule j with y=0 in the "then" part is replaced by 1−$p_j$, and y=1 substitutes for y=0.

For the prediction Q-condition, the relevant rules are selected, and the mean of the probabilities of these rules is calculated. The resultant value of the mean probability may be considered as a probability P that y=1 for the prediction Q-condition. If P>$p_a$ (wherein $p_a$ is the a priori probability that y=1), then it is predicted that y=1 with error probability 1−P. If P<$p_a$, then it is predicted that y=0 with error probability P.

When a prediction is made for records in a database, the mean probability of the relevant rules is calculated for each record. The records are then sorted in descending order of their mean probabilities that y=1. y=1 is thus predicted for the first $p_a$N records, wherein N is the number of records in the prediction database. For the remaining (1−$p_a$)N records, it is predicted that y=0. The application of the prediction method is justified by a property of the association rules that was demonstrated above, and which can be restated as follows: the probability that a rule $j \in J_1$ ($j \in J_0$) is relevant to a record $i \in I_1$ ($i \in I_0$) is greater than a probability that this rule is relevant to a record $i \in I_0$ ($i \in I_1$).

In fact, for the example given in FIG. 8A, a record with y=1 has, on average, two relevant rules with y=1 in the "then" part and one relevant rule with y=0 in the "then" part. A record $i \in I_0$ has, on average, 1.29 relevant rules belonging to subset $J_1$ and 1.71 rules belonging to subset $J_0$.

FIG. 9 is a table showing the results of this prediction on the database of FIG. 8A. There are 2 errors in the prediction: one error of the first kind (at record 2) and one error of the second kind (at record 17).

The described prediction method is based on an assumption that the a priori probability that y=1 is the same for the training database and for future databases from the overall population. In a case in which there are no grounds for such an assumption, a boundary value $P_b$ of a mean probability P is preferably determined such that if P>$p_b$ (P≦$p_b$), then y=1 (y=0) is predicted.

The determination of the value $p_b$ is based on an analysis of a sequence $\{P[k]\}$ of mean probabilities (that y=1) for records of the sorted training database, wherein $P[k_1] \geq P[k_2]$ for $k_1<k_2$. Here index k is a serial number of a mean probability in the sorted training database. For the example shown in FIG. 8A, the sequence {P[k]} is presented in the third row of the table in FIG. 9, and the corresponding sequence of indices k is given in the first row of the table. For each k, the actual value of y is given in the last row of the table.

Assume that we have determined a serial number $k_b$, such that y=1 is predicted for all records corresponding to $k>k_b$, and y=0 is predicted for all records corresponding to $k \leq k_b$. In the example of FIG. 9, if $k_b$=4, then the vector of predicted values of y consists of three ones followed by 17 zeroes. Comparing this Boolean vector with the Boolean vector of actual values of y in the last line of the table, the number of non-coincident values in corresponding components of these two vectors (equal to the number of ones in the modulo-2 sum of these vectors) will be equal to the number of errors in the prediction. For $k_b$=4, the number of errors in the prediction is equal to 3 (at columns 4, 5 and 7).

There exist N+1 potential variants for the determination of $k_b$ (from 0 to N ones in the vector of predicted values of y). Among these variants, for a value of $k_b$ that minimizes the number of non-coincidences (errors), the corresponding value $P[k_b]$ can then be taken as the above-mentioned boundary value $p_b$. For the example shown in FIG. 9, there are two optimal solutions: 1) $k_b$=6; and 2) $k_b$=8. The corresponding boundary values of mean probability are 0.33 and 0.3, respectively. Each of these solutions causes only one error to be made in the prediction. There is a difference between the solutions, however: for $k_b$=6 ($p_b$0.33), an error of the first kind is made (at column 7, record 2); whereas for $k_b$=8 ($p_b$=0.3), an error of the second kind is made (at column 6, record 17).

If the "costs" of errors of the first and second kinds are given, then instead of the minimization of the number of errors, the minimization of the total cost of errors is used as a criterion for determining the optimal value $k_b$. If $k_b \neq 1$ and $P[k_b]-P[k_b-1]>0.01$, it is preferable to take the optimal boundary value $$Pb = \frac{P[k_b] + P[k_b - 1]}{2}.$$

In this case, we predict y=1, if $P>_{pb}$ and y=0, if $P<_{pb}$; the decision point $_{pb}$ is an ambiguous point for prediction.

Alternatively, when predicting on the basis of simple association rules, instead of computing the mean probability of rules relevant to a fixed record, the weighted average rule probability may be calculated. The significance level of a relevant rule is preferably taken as a weight for the probability of the rule. The significance level of rule j is defined as $1-\alpha_j$, wherein $\alpha_j$ is the probability that a rule j in the training database exists by chance. To precisely define $\alpha_j$, assume that rule j has probability $p_j$ (that y=1) and support $s_j$. $\alpha_j$ is then the a priori probability that this rule, or any such rule for which the probability is not less than $p_j$, will be determined.

Formally, assume that $m_j$ records have been chosen at random from a database containing N records, among which there are $p_a N$ records with y=1, and the condition of rule j is satisfied by these $m_j$ records. In other words, $$m_j = \frac{s_j}{p_j}$$

is the number of records satisfying the condition of rule j. $\alpha_j$ is the probability that there are not less than $s_j$ records with y=1 among these $m_j$ records. $\alpha_j$ is calculated by the formula of hypergeometric distribution, as is known in the art. $\alpha_j$ may similarly be determined for rule j with y=0 in the "then" part, by taking $m_j$ records from the database in which there are $(1-p_a)N$ records with y=0. The smaller $\alpha_j$, the greater is the "weight" of rule j.

There are two factors that cause difficulty when prediction is carried out on the basis of simple association rules alone, especially, when only "weak" association rules have been determined, as in the example from the previous section:

First, each association rule j has $s_j$ positive examples and $n_j=m_j-s_j$ negative examples, wherein $$m_j = \frac{s_j}{p_j}.$$

A positive example of rule j is a record of the training database at which both the condition and the conclusion of rule j are fulfilled. A negative example of rule j is a record satisfying the rule's condition at which the rule's conclusion is not fulfilled. Because it is not possible to distinguish between positive and negative examples of the relevant rule when predicting on the basis of simple association rules, the probability of the relevant rule must be assigned to each record satisfying the rule's condition.

Second, among the simple association rules that are determined, some rules are independent, and others are dependent to various degrees. Although this factor must influence the prediction results, there is no way known in the art to save and to use this information, despite the enormous number of different combinations in which relevant rules may appear. The stability of such individual dependencies must also be evaluated.

Addressing the first difficulty, assume, for definiteness, that rule $\hat{j}$ has y=1 in the "then" part, i.e., $\hat{j} \epsilon j_1$. Rule $\hat{j}$ is formulated as follows: if $C_j^{(1)}$ then y=1, with probability $p_j$ and support $s_j$, wherein $C_j^{(1)}$ is the q-condition. If $p_j$=1, then there exists no negative example, and the difficulty does not exist. Assuming that $p_j>1$, if there exists another association rule with a $q_1$-condition ($q_1>q$) containing all the components of the q-condition and whose probability that y=1 is 1, then the second rule covers all the positive examples of rule $\hat{j}$. If the second rule's probability is 1, but it contains y=0 in the "then" part, then the second rule covers all the negative examples of rule $\hat{k}$. In both of these cases, according to the definition of a relevant rule given above, if the $q_1$-condition is fulfilled, then only the second rule is relevant, and rule $\hat{j}$ is not relevant in spite of fulfillment of $C_j^{(1)}$. Unfortunately, such cases are rare. Furthermore, the information of greatest interest in the set of all association rules that are determined is typically found in pairs of association rules that are most unexpected.

In a preferred embodiment of the present invention, for the above-mentioned rule $\hat{j}$ having undistinguished positive and negative examples, let the sets of positive and negative examples of a rule j be denoted by $I_j^{(pos)}$ and $I_j^{(neg)}$, respectively. To find an optimal covering of set $I_j^{(pos)}$, we incorporate conditions of other association rules belonging to $J_1$, selected from the set:

$$\{j \epsilon J_1 | I_j^{(pos)} \cap I_j^{(pos)} \neq \emptyset, I_j^{(neg)} \cap I_j^{(neg)} \emptyset\} \qquad (40)$$

If $\{C_{j1}^{(1)}, \ldots, C_{jk}^{(1)}\}$ are the conditions of rules incorporated in this optimal covering, we find the following generalized rule:

$$\text{if } C_j^{(1)} \cdot (C_{j1}^{(1)} v \ldots v C_{jk}^{(1)}) \text{ then y=1} \qquad (41)$$

Generalized rule (41) states that the aggregate condition $(C_{j1}^{(1)} v \ldots v C_{jk}^{(1)})$ and the condition $C_j^{(1)}$ of rule $\hat{j} \epsilon J_1$ are compatible only at records with y=1, and they are incompatible on the subset $I_0$ of records at which y=0. Thus, rule (41) covers the positive examples of rule ĵ. The support of generalized rule (41) is equal to the support sĵ of rule ĵ, wherein $\text{Sĵ} \geq S_{min}$, by the definition of an association rule.

Generalized rule (41) may be transformed as follows:

$$\text{if } (C_j^{(1)\wedge} C_{j1}^{(1)}) \vee \ldots \vee (C_j^{(1)\wedge} C_{jk}^{(1)}) \text{ then } y=1 \qquad (42)$$

Each of the conjunctive conditions $(C_j^{(1)\wedge} C_{jl}^{(1)}, l=1, \ldots, k$, satisfies the respective association rule: if $(C_j^{(1)\wedge} C_{jl}^{(1)}$ then y=1. The probability of this rule is 1, and its support is equal to the number $|I_j^{(pos)} \cap I_{jl}^{(pos)}|$ of records satisfying the condition $C_j^{(1)\wedge} C_{jl}^{(1)}$. (The set of records satisfying the condition $C_j^{(1)\wedge} C_{jl}^{(1)}$ is $(I_j^{(pos)} \cap I_{jl}^{(neg)}) \cup (I_{jl}^{(pos)} \cap I_{jl}^{(neg)}) = I_j^{(pos)} \cap I_{jl}^{(pos)}$, since for any rule j, $I_j^{(pos)} \subset I_1$, $I_j^{(neg)} \subset I_0$, and $i_1 \cap I_0 = \emptyset$, so that $I_j^{(neg)} = \emptyset$ according to equation (40).) No such conjunctive rule is found in the present case, however, since rule ĵ is assumed here to have undistinguished positive and negative examples. Otherwise, the problem would degenerate to the case considered above, in which there exists a simple association rule covering all the positive examples of rule ĵ.

The only case in which no association rule with condition $(C_j^{(1)\wedge} C_{jl}^{(1)})$ can be found is if $|I_j^{(pos)} \cap I_{jl}^{(pos)}| < S_{min}$. At the same time, it is assumed that the support of generalized rule (42) is not less than $S_{min}$. Therefore, taking into consideration that only records with y=1 satisfy condition $(C_j^{(1)\wedge} C_{jl}^{(1)})$ for any l, the following restriction is preferably made on the number $|I_j^{(pos)} \cap I_{jl}^{(pos)}|$ for any association rule $_{jl}$ to be included in the covering: $|I_j^{(pos)} \cap I_{jl}^{(pos)}| \geq s_{min}$, wherein $s_{min} < S_{min}$, for example, $s_{min} = S_{min}/2$. Thus, an optimal covering of set $I_j^{(pos)}$ is searched for on the set of rules defined (unlike the definition in equation (40)) as follows:

$$\{j \in J_1 | |I_j^{(pos)} \cap I_j^{(pos)}| \geq s_{min}, I_j^{(neg)} \cap I_j^{(neg)} = \emptyset\} \qquad (43)$$

In the example given above in FIG. 8A, $S_{min}=1$, then we find, for instance, the following generalized rule of the type given by equation (41):

$$\text{if } C_3^{(1)\wedge} (C_4^{(1)} \vee C_5^{(1)}) \text{ then } y=1. \qquad (40)$$

In an additional preferred embodiment of the present invention, not only the positive examples of rules ĵ, but the negative examples, as well, are covered by generalized association rules. For this purpose, an optimal covering of set $I_j^{(neg)}$ is found using rules selected from the set:

$$\{j \in J_0 | |I_j^{(neg)} \cap I_j^{(neg)}| \geq s_{min}, I_j^{(pos)} \cap I_j^{(pos)} = \emptyset\} \qquad (44)$$

Assuming $\{C_{jk+1}^{(0)}, \ldots, C_{jK}^{(0)}\}$ to be the conditions of rules to be entered in the optimal covering of set $I_j^{(neg)}$, when these conditions are added to the conditions of generalized rule (41) found previously, the following generalized rule is found:

$$\text{if } C_j^{(1)\wedge} (C_{j1}^{(1)} \vee \ldots \vee C_{jk}^{(1)})^\wedge \neg (C_{jk+1}^{(0)} \vee \ldots \vee C_{jK}^{(0)}) \text{ then } y=1 \qquad (45)$$

The support of generalized rule (41) does not change after addition of condition $\neg (C_{jk+1}^{(0)} \vee \ldots \vee C_{jK}^{(0)})$, since according to equation (44), $I_{jl}^{(pos)} \cap I_j^{(pos)} = \emptyset$, l=k+1, ..., K. Thus, the support of generalized rule (45) is equal to $s_ĵ > S_{min}$. In addition to the above-mentioned statement of generalized rule (41), generalized rule (45) states that the aggregate condition $(C_{jk+1}^{(0)} \vee \ldots \vee C_{jK}^{(0)})$ and the condition $C_j^{(1)}$ of rule ĵ∈J₁ are compatible only at records with y=0, and they are incompatible on the subset $I_1$ of records at which y=1.

Taking into account rule (42), generalized rule (45) can be reformulated as follows:

$$\text{if } ((C_j^{(1)\wedge} C_{j1}^{(1)}) \vee \ldots \vee (C_j^{(1)\wedge} C_{jk}^{(1)}))^\wedge \neg (C_{jk+1}^{(0)} \vee \ldots \vee C_{jK}^{(0)}) \text{ then } y=1 \qquad (46)$$

If the definition of a simple association rule is modified by substituting the requirement $s \geq s_{min}$ for $s \geq S_{min}$ only for rules whose probability p=1, then each conjunctive condition $(C_j^{(1)\wedge} C_{jl}^{(1)})$, l=1, ..., k in rule (46) would be the condition of such an association rule. Generalized rule (46) then belongs to type 3, as shown in FIG. 7.

In an analogous manner, for a rule ĵ∈J₀, the generalized rule:

$$\text{if } C_j^{(0)\wedge} (C_{j1}^{(0)} \vee \ldots \vee C_{jk}^{(0)})^\wedge \neg (C_{jk+1}^{(1)} \vee \ldots \vee C_{jK}^{(1)}) \text{ then } y=0 \qquad (47)$$

is found. According to the extended definition of an association rule, generalized rule (47) belongs to type 4.

Generalized rules (45) and (47) make no prediction errors on the training database. In this respect, these rules are similar to generalized rules determined using other methods such as minimization of functionals, as described in the preceding section of the present patent application. At the same time, there are significant differences between these generalized rules:

1) The generalized rules described in the preceding section are determined by considering the global structure of matrix $C=\|c_{ij}\|$, whereas rules (45) and (47) consider only the part of this matrix relating to the corresponding association rule.

2) The generalized rules described in the preceding section have the maximum support that the input matrix $C=\|c_{ij}\|$ can give. Generalized rules (45) and (47) have a support exactly equal to the support of the corresponding association rule ĵ. Therefore, it can generally be assumed that each generalized rule of the type described in the preceding section covers a significantly greater number of records, and that its validity is more stable for future data, i.e., records outside the training database.

3) In the preferred embodiments described in the preceding sections, substantially independent generalized rules are sought. The independence of the rules simplifies their joint use for prediction. Among rules of types (45) and (47), many dependent ones may be found, since generally there are association rules having at least partly overlapping coverage. This disadvantage may be reduced by eliminating simple rules already incorporated in generalized rules (45) and (47) in searching for other such generalized rules, but then the number of rules (45) and (47) may be sharply reduced. Such an approach for finding independent generalized rules will have relatively little influence on the number of generalized rules that are found using the methods of the preceding section, since these generalized rules are searched on the corresponding full subsets of association rules not restricted by the requirements of subsets (43) and (44).

In preferred embodiments of the present invention, the generalized rules found in accordance with any of the methods described above are used to predict unknown values of the Field to Predict y on records from a future database, i.e., records outside the training database. A generalized rule is considered relevant to a given prediction Q-condition, as defined above by equation (39), if the set of input fields entered in the aggregate condition of the generalized rule is a subset of the set of fields of the prediction Q-condition, and if the value of each field of this subset given in the prediction Q-condition satisfies the corresponding condition of this field in the aggregate condition of the generalized rule. Prediction is then carried out on the basis of the generalized rules that are relevant to the particular prediction Q-condition.

FIG. 10 is a table summarizing the generalized rules listed in FIG. 8B, as they apply to the records in the training database of FIG. 8A. Each relevant generalized rule uniquely predicts the determinate value of the Field to Predict, which is listed in the appropriate entry of the table. It is observed that when predicting for the training database, all the generalized rules relevant to a given record predict the same value of y, unlike the case with simple association rules illustrated in FIG. 9.

For the future database, however, it may occur that $g_1$ relevant generalized rules predict y=1, and simultaneously, $g_0$ relevant generalized rules predict y=0 for a given record. For this record, there is a probability $$P = \frac{g_1}{g_1 + g_0}$$

that y=1. In other words, if $g_1 > g_0$, we can predict y=1 with error probability $$\frac{g_0}{g_1 + g_0};$$

if $g_1 < g_0$, we can predict y=0 with error probability $$\frac{g_1}{g_1 + g_0};$$

and if $g_1 = g_0$, then values y=1 and y=0 are equiprobable. The values of the error probability thus defined belong to the interval [0, 0.5). An absolute value of the difference $\Delta g = g_1 - g_0$ will also have an influence on a level of confidence in the prediction accuracy.

Moreover, a priori (as a result of searching for generalized rules), the number of generalized rules with respect to a record with y=1 may, on average, differ from the number of generalized rules for a record with y=0. The average number of relevant rules for a record in the training database at which y=1 (y=0) is calculated as the sum of supports of all the generalized rules that are found predicting y=1 (y=0), divided by the total number of records with y=1 (y=0). Denoting these two average numbers by $\hat{g}_1$ ($\hat{g}_0$) respectively, and the difference $\hat{g}_1 - \hat{g}_0$ by $\Delta \hat{g}$, it is seen in the example of FIG. 10 that $\hat{g}_1 = 7/6 = 1.17$; $\hat{g}_0 = 24/14 = 1.71$; and $\Delta \hat{g} = 1.17 - 1.71 = -0.54$. It can be assumed for future data that the average value of the difference $\Delta g$ will be approximately equal to $\Delta \hat{g}$. If the absolute value of $\Delta \hat{g}$ is great, then when predicting for future data, the likelihood of predicting y=1 differs considerably from that of predicting y=0. This circumstance is not of decisive importance if the future database is similar to the training database in terms of validity of the generalized rules that are found. It should be taken into account, however, in case in which the future database and the training database are not sufficiently similar.

To evaluate a measure of the similarity of future and the training databases, note that when predicting for the training database, there is no a case in which for a given record i, at least one of the numbers $g_1[i]$ and $g_0[i]$ is not equal to 0, wherein $g_1[i]$ ($g_0[i]$) is the number of generalized rules relevant to record i and predicting y=1 (y=0), respectively. Therefore, the sum of the absolute values of differences $g_1[i] - g_0[i]$, divided by the total number N of records in this database, $$\rho_{tr} = \left( \sum_{i=1}^{N} |g_1[i] - g_0[i]| \right) / N = p_a \bar{g}_1 + (1 - p_a) \bar{g}_0,$$

will be, in a sense, maximal. The corresponding value $\rho$ for the future database to predict is calculated in analogous fashion. The value $\rho$ will almost always be less than $\rho_{tr}$. A parameter r, given generally by $$r \sim \frac{\rho}{\rho_{tr}},$$

can be considered to be a measure of the similarity of the future and the training databases. If r is equal to its maximal value 1, when the future database is substantially identical to the training one. The smaller the value r, the less the similarity of the future and the training databases. Empirical results show that if the future database belongs to the same overall population as the training database, then r is practically always in the range $0.5 \leq r \leq 1$.

Consider a record of the future database for which there are $g_1$ relevant generalized rules predicting y=1 and go relevant generalized rules predicting y=0. (If the above-mentioned coefficient r is sufficiently great, then there will be a great many records in the future database for which or $g_1 = 0$ or $g_0 = 0$.) In accordance with preferred embodiments of the present invention, we predict y=1 if $\Delta g = g_1 - g_0 > 0$, and we predict y=0 if $\Delta g < 0$ (with the corresponding error probabilities described above). $\Delta g = 0$ is an ambiguous point for prediction.

In a preferred embodiment of the present invention, taking into account the above considerations regarding a possible relative "deficiency" of generalized rules that are found with y=1 (or y=0) in the "then" part, the domain of prediction ambiguousness is extended from the ambiguous point at which $\Delta g = 0$ to encompass an ambiguous segment including this point as its boundary value. Assuming, for definiteness, that $\Delta \hat{g} > 0$, there exists a certain relative "shortage" of generalized rules found with y=0 in the "then" part. If $\Delta \hat{g}$ is small, then this shortage can be neglected. Otherwise, to predict the value of y for a record on the basis of relevant generalized rules, it is first required to check that $\Delta g$ does not belong to the ambiguous segment defined by a lower bound at 0 and an upper bound at $\phi(r) \Delta \hat{g}$, wherein $\phi(r)$ is a decreasing function of the ratio r. $\phi(r)$ is preferably defined as a linear function satisfying the conditions: $\phi(0.5)=1$; and $\phi(1)=0$. Most preferably $\phi(r) = 2(1-r)$, wherein $$r = \frac{\max(\min(\rho, \rho_{tr}), 0.5 \rho_{tr})}{\rho_{tr}}.$$

Thus, if $\Delta \hat{g} > 0$, the ambiguous segment is $[0, 2(1-r)\Delta \hat{g}]$. If $\Delta \hat{g} < 0$, the ambiguous segment is $[2(1-r)\Delta \hat{g}, 0]$. The smaller $\Delta \hat{g}$ and/or the greater r, the smaller is the extent of the ambiguous segment. Since $\Delta g = g_1 - g_0$ is an integer, instead of the nonzero bound $2(1-r)\Delta \hat{g}$, an integral part of this number can be taken to determine whether $\Delta g$ belongs to the ambiguous segment. Hence, in general, the ambiguous segment degenerates to ambiguous point 0 if $|2(1-r)\Delta \hat{g}| < 1$, and particularly when r=1 (independently of $\Delta \hat{g}$), or $\Delta \hat{g} = 0$ (independently of r).

In another preferred embodiment of the present invention, an "imbalance" between generalized rules that are found predicting y=1 and those predicting y=0 is generally overcome by finding additional generalized rules whose probabilities are not exactly equal to 1, but near to 1. For example, if there is a relative shortage of rules predicting y=1, we can search for generalized rules predicting y=1 with a probability not less than 0.99. In this case, the number $g_1$ of generalized rules relevant to a given record is replaced in the calculations by the sum of the probabilities of the relevant generalized rules. $\Delta g$, as well as $\Delta \hat{g}$, may thus be non-integer, and in the ambiguous segment, the integral part of the bound $2(1-r)\Delta \hat{g}$ is preferably not taken.

As noted hereinabove, the problem of a relative "deficiency" of rules determined with y=1 (or y=0) in the "then" part may exist for simple association rules, too. The boundary value $p_b$ of the mean probability P of relevant rules for a record was derived such that y=1 is predicted if $P > p_b$, and y=0, if $P \leq p_b$. The sign of the difference $\Delta p = p_b - p_a$ determines which of the association rules (with y=1, or with y=0 in the "then" part) exist in relatively smaller numbers, and $|\Delta p|$ is a measure of the "shortage." Since a relative shortage of association rules with y=1 in the "then" parts, for example, means that relatively many association rules have been determined with y=0 in the "then" part, there is in this case a good chance of finding generalized rules of type 2 predicting y=1. As a result, even when there is a relative shortage of simple association rules of one type or the other, methods in accordance with preferred embodiments of the present invention using generalized association rules will tend to give a more or less "balanced" set of rules for prediction.

Figure 11:
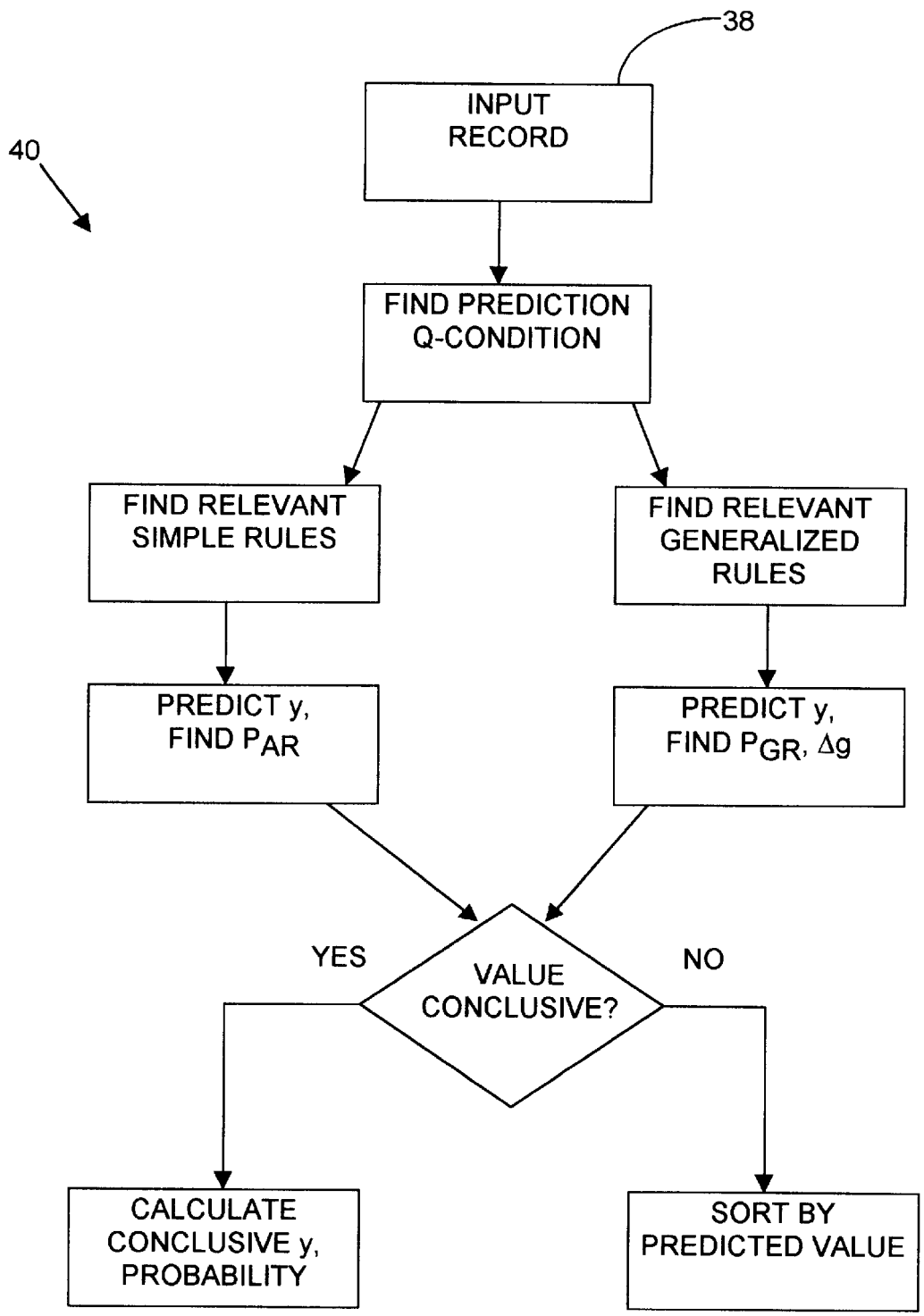
FIG. 11 is a flow chart illustrating a method of predicting data values using association rules, in accordance with a preferred embodiment of the present invention.

FIG. 11 illustrates a method of predicting values of the unknown field y, in accordance with another preferred embodiment of the present invention, in which the prediction is based on the use of both generalized and simple association rules. For a given record, a value of y is predicted on the basis of relevant generalized rules (if $\Delta g = g_1 - g_0 \neq 0$) and a probability $P_{GR}$ that y=1 is calculated. $\Delta g$ is evaluated to determined whether the record belongs to the ambiguous segment. In most cases, the ambiguous segment consists of the single point 0, which corresponds to the case of $g_1 = g_0$, and $P_{GR} = 0.5$. If $\Delta g$ does not belong to the ambiguous segment, then the greater the difference between $\Delta g$ and the nearest (to $\Delta g$) bound of the ambiguous segment, the greater is the confidence in the prediction result.

Preferably, a prediction is made for the same record based on relevant simple association rules, to predict the value of y and determine a probability $P_{AR}$ that y=1. Confidence in this prediction result is evaluated according to the location of point $P_{AR}$ inside or outside of the ambiguous segment, which is defined in this case based on the boundary value $p_b$ of the mean probability, which is preferably determined as described hereinabove with reference to FIG. 9. An $\epsilon$-neighborhood of point $p_b$ can be considered as the ambiguous segment for prediction based on simple association rules, depending on evaluation of the similarity of the future database and the training database. If $P_{AR}$ does not belong to the ambiguous segment, a measure of confidence in the prediction result is given by the extent of deviation of $P_{AR}$ from the nearest bound of the ambiguous segment.

In most cases, both of these prediction methods, based on generalized and simple association rules, will predict the same value of y. This value of y is accepted as the conclusive predicted one, as long as neither of the values $\Delta g$ and $P_{AR}$ belongs to the respective ambiguous segment. The conclusive probability that y=1 is calculated as the weighted average of $P_{GR}$ and $P_{AR}$, wherein the above-mentioned measures of confidence in the prediction results are preferably taken as the corresponding weights. If one of the predictions belongs to the ambiguous segment, then it gets a very small weight. (This weight is preferably determined by a predetermined parabolic function having the value 0 at the midpoint of the ambiguous segment and a small value at boundary points of this segment.) If the record under consideration has either no relevant rules of the generalized or of the simple type, then the prediction is based on whichever type of rule is available, and its corresponding probability that y=1 is taken as the conclusive one. In the case in which the two sets of rules predict different values of y, the conclusive probability that y=1 is calculated by weighted average, analogously to the case in which these values coincide.

In this manner, most of the records of the database generally receive unambiguous, conclusive predicted values of y. Assume that $q_1$ such records have the conclusive predicted value y=1, $q_0$ records have y=0, and $q_1 < p_a N$, $q_0 < (1-p_a)N$, wherein N is the number of records in the prediction database, and $p_a$ is the a priori probability that y=1 in the training database. The remaining $N-(q_1+q_0)$ records are preferably sorted in descending order of their probabilities that y=1. Assuming that the a priori probability $p_a$ is approximately the same for the future and the training databases, then the conclusive predicted value y=1 is assigned to the first $p_a N - q_1$ records, and the remaining $(1-p_a)N - q_0$ records get the value y=0. If $q_1 \geq p_a N$, then for all the remaining records y=0. If $q_0 \geq (1-p_a)N$, then for all the remaining records y=1. In the latter two cases, the assumption that $p_a$ is the same for the future and the training databases may prove to be incorrect. In the general case in which there are no grounds for such an assumption, a boundary value (decision point) for conclusive probabilities can be determined analogously to the determination of the decision point $p_b$ for the prediction based on simple association rules.

In some preferred embodiments of the present invention, the methods described above are used to output predictions as to one or more attributes of items whose characteristics are stored in respective records in the database, for example, so as to sort the items into groups according to an attribute of interest. In other preferred embodiments, variants of these methods are used to identify and/or sort input images or sounds according to patterns appearing in appropriate sensor data received from input device 22 (FIG. 2). Although certain specific preferred embodiments are described hereinabove with reference to database applications, those skilled in the art will appreciate the wide range of applications of and variations on the methodology described herein, all of which are within the scope of the present invention.

It will thus be appreciated that the preferred embodiments described above are cited by way of example, and the full scope of the invention is limited only by the claims.

What is claimed is:

1. A method for predicting an unknown value of an attribute of interest of a given item from a population of items, each item in the population having a plurality of variable attributes including the attribute of interest, comprising:

storing in a memory known attribute values regarding a training sample of items within the population including the attribute of interest; and processing the stored attribute values to determine association rules regarding the training sample, including at least one generalized association rule, each association rule comprising one or more conditions on one or more respective attribute values of the items predictive of the value of the attribute of interest, and the at least one generalized rule comprising a logical combination of a plurality of such conditions using at least one logical operation from a group consisting of disjunction and negation.

2. A method according to claim 1, wherein processing the attribute values comprises finding the at least one generalized rule such that a support of the rule is maximized on the training sample.

3. A method according to claim 2, wherein finding the at least one generalized rule comprises finding a generalized association rule predicting that the attribute of interest has a given value, such that the support of the generalized rule in the training sample comprises at least ten times as many items having the given value of the attribute of interest as having another value, not equal to the given value.

4. A method according to claim 3, wherein finding the generalized association rule comprises finding a rule whose support in the training sample comprises substantially only items having the given value of the attribute of interest.

5. A method according to claim 1, wherein processing the attribute values comprises finding a plurality of generalized association rules such that an overlap of the respective supports of two or more of the plurality of rules on the training sample is minimized.

6. A method according to claim 1, wherein processing the attribute values comprises finding a plurality of generalized association rules such that substantially all of the items in the training sample are included in the support of one or more of the generalized rules.

7. A method according to claim 6, wherein finding the plurality of generalized rules comprises finding first and second groups of generalized rules that are respectively predictive of first and second values of the attribute of interest, such that there is an approximately equal number of rules in each group.

8. A method according to claim 1, wherein the at least one generalized association rule comprises a rule predicting that the attribute of interest has a first value if a condition substantially of a form $\neg(C_{j1}^{(i)} \lor C_{j2}^{(i)} \lor \ldots \lor C_{jk}^{(i)})$ is fulfilled, wherein j1, j2, . . . , jk are indices enumerating conditions represented collectively as $C_{jm}^{(i)}$, m an arbitrary index running from 1 to k, and i an index representing a conclusion of the conditions, and wherein each $C_{jm}^{(i)}$ represents a condition on a known attribute value of the item other than the attribute of interest, which is predictive that the attribute of interest will have another value, different from the first value.

9. A method according to claim 1, wherein the at least one generalized association rule comprises a rule predicting that the attribute of interest has a first value if a condition substantially of a form $(C_{j1}^{(i1)} \lor C_{j2}^{(i1)} \lor \ldots \lor C_{jk}^{(i1)})^{\wedge} \neg (C_{jk+1}^{(i2)} \lor C_{jk+2}^{(i2)} \lor \ldots \lor C_{jK}^{(i2)})$ is fulfilled, wherein j1, j2, . . . , jk, jk+1, jk+2, . . . , jK are indices enumerating conditions represented collectively as $C_{jm}^{(i1)}$ and $C_{jm}^{(i2)}$ m an arbitrary index running from 1 to K, and i1 and i2 are indices representing conclusions of the conditions, and wherein each $C_{jm}^{(i1)}$ represents a condition on a known attribute value of the item other than the attribute of interest which is predictive that the attribute of interest will have the first value, and each $C_{jm}^{(i2)}$ represents a condition on a known attribute value of the item other than the attribute of interest which is predictive that the attribute of interest will have another value, different from the first value.

10. A method according to claim 9, wherein processing the attribute values comprises finding the set of rules $\{C_{j1}^{(i1)} \ldots C_{jk}^{(i1)}\}$ and then searching for rules in the set $\{C_{jk+1}^{(i2)} \ldots C_{jK}^{(i2)}\}$ on the support of $\{C_{j1}^{(i1)} \ldots C_{jk}^{(i1)}\}$.

11. A method according to claim 1, wherein processing the attribute values comprises finding simple association rules, wherein each simple association rule comprises one or more conditions on one or more respective attribute values of the items predictive of the value of the attribute of interest, such that if the simple association rule includes more than one such condition, the conditions are combined using the logical conjunction operation in defining the conditions of the rule.

12. A method according to claim 11, and comprising:
receiving data from an input device, the data including values of at least some of the attributes of the given item; and
applying the association rules including the at least one generalized association rule to the values included in the data so as to predict the unknown value of the attribute of interest of the given item.

13. A method according to claim 12, wherein applying the association rules comprises applying both the simple and the at least one generalized association rules jointly to predict the unknown value.

14. A method according to claim 13, wherein applying the rules jointly comprises computing a weighted sum of values of the attribute of interest predicted by the rules.

15. A method according to claim 14, wherein computing the weighted sum comprises computing probabilities respectively associated with the simple and generalized rules, and weighting the predicted values by the respective probabilities.

16. A method according to claim 11, wherein finding the association rules comprises finding the at least one generalized association rule by combining a plurality of the simple association rules.

17. A method according to claim 16, wherein combining the plurality of the simple association rules comprises combining the rules to find a generalized rule which includes a disjunction of two or more of the simple rules.

18. A method according to claim 16, wherein combining the plurality of the simple association rules comprises combining the rules to find a generalized rule which includes a negation of one or more of the simple rules.

19. A method according to claim 11, wherein determining the simple association rules comprises determining substantially all simple association rules pertaining to the sample having respective probability and support greater than predetermined minimum values thereof.

20. A method according to claim 1, wherein processing the attribute values comprises encoding values of the attributes according to the frequency of their occurrence in the training sample.

21. A method according to claim 20, wherein encoding the values comprises calculating hash functions.

22. A method according to claim 20, wherein encoding the values comprises assigning a distinguishable code to values occurring at less than a predetermined frequency in the training sample, whereby such values are substantially excluded from the determination the of association rules.

23. A method according to claim 1, and comprising:
receiving data from an input device, the data including values of at least some of the attributes of the given item; and
applying the association rules including the at least one generalized association rule to the values included in the data so as to predict the unknown value of the attribute of interest of the given item.

24. A method according to claim 23, wherein applying the association rules comprises applying a subset of the rules consisting of rules whose one or more conditions are fulfilled by known values of attributes of the given item other than the item of interest.

25. A method according to claim 23, wherein processing the attribute values comprises finding probabilities corresponding to the determined association rules, and wherein applying the association rules comprises applying the probabilities to compute a cumulative probability that the attribute of interest has a given value.

26. A method according to claim 25, wherein computing the cumulative probability comprises computing a weighted sum of the probabilities corresponding respectively to the association rules applied in predicting the value.

27. A method according to claim 25, and comprising determining a probability decision point such that when the cumulative probability is greater than the decision point, the attribute of interest is predicted to have a first value, and when the probability of interest is less than the decision point, the attribute of interest is predicted to have a different, second value.

28. A method according to claim 27, wherein determining the decision point comprises defining an ambiguity range of probabilities including the decision point in which the predicted value is ambiguous.

29. A method according to claim 28, wherein defining the ambiguity range comprises comparing the training sample and at least a portion of the overall population from which the given item is taken, and determining an extent of the ambiguity range responsive to a measure of the similarity of the training sample and the at least portion of the overall population.

30. A method according to claim 27, wherein determining the decision point comprises defining a point such that a total number of prediction errors is minimized.

31. A method according to claim 27, wherein an error cost is assigned to each of a plurality of types of prediction errors, and wherein determining the decision point comprises defining a point such that a total cost of prediction errors is minimized.

32. A method according to claim 23, wherein the items comprise records in a database, and the attributes comprise fields in the records, and wherein applying the association rules comprises predicting the unknown value of a database field.

33. A method according to claim 32, wherein predicting the unknown value comprises predicting a Boolean value.

34. A method according to claim 23, wherein the items comprise sounds, and the attribute values comprise characteristics of sound signals corresponding to the sounds, and wherein applying the association rules comprises identifying a sound signal.

35. A method according to claim 34, wherein identifying the sound signal comprises finding a word corresponding to the signal.

36. A method according to claim 34, wherein identifying the sound signal comprises identifying a speaker who generated the sound signal.

37. A method according to claim 34, wherein receiving the data comprises receiving data from a microphone.

38. A method according to claim 23, wherein the items comprise images, and the attribute values comprise image features, and wherein applying the association rules comprises processing an image.

39. A method according to claim 38, wherein processing the image comprises identifying a subject of the image.

40. A method according to claim 38, wherein receiving the data comprises receiving data from a camera.

41. A method according to claim 38, wherein receiving the data comprises receiving data from a scanner.

42. A method according to claim 23, and comprising outputting an indication of the predicted value to an output device.

43. A method according to claim 42, wherein outputting the indication comprises displaying the predicted value and a probability thereof.

44. A method according to claim 42, wherein outputting the indication comprises controlling an access responsive to the predicted value.

45. A method according to claim 42, wherein outputting the indication comprises sorting the given item responsive to the predicted value.

46. A method for predicting an unknown value of an attribute of interest of a given item from a population of items, each item in the population having a plurality of variable attributes including the attribute of interest, comprising:

storing in a memory known attribute values regarding a training sample of items within the population including the attribute of interest;

processing the attribute values to determine simple association rules regarding the training sample, each simple association rule comprising one or more conditions on one or more respective attribute values of the items predictive of the value of the attribute of interest, such that if the simple association rule includes more than one such condition, the conditions are combined using a logical conjunction operation in defining the conditions of the rule, wherein substantially all simple association rules applicable to the sample having respective probability and support greater than predetermined minimum values thereof are determined.

47. A method according to claim 46, wherein processing the attribute values comprises constructing a contingency table, each of whose entries corresponds to the number of items in the sample having a given value of the attribute of interest and a given, respective value of another one of the attributes, and wherein the association rules are determined with respect to the contingency table.

48. A method according to claim 46, and comprising:

receiving data from an input device, the data including values of at least some of the attributes of the given item; and applying the association rules to the values included in the data so as to predict the unknown value of the attribute of interest of the given item.

49. A method for predicting an unknown value of an attribute of interest of a given item from a population of items, each item in the population having a plurality of variable attributes including the attribute of interest, comprising:

storing in a memory known attribute values regarding a training sample of items within the population including the attribute of interest;

processing the attribute values to determine association rules regarding the training sample, each association rule comprising one or more conditions on one or more respective attribute values of the items predictive of the value of the attribute of interest, wherein the attribute values are processed by constructing a contingency table, each of whose entries corresponds to the number of items in the sample having a given value of the attribute of interest and satisfying a given, respective condition on one or more of the attributes other than the attribute of interest, and wherein the association rules are determined with respect to the contingency table.

50. A method according to claim 49, wherein constructing the contingency table comprises constructing a table of 1-conditions, characterized in that the condition on the one or more of the attributes comprises a condition on a single one of the attributes.

51. A method according to claim 50, wherein constructing the contingency table comprises constructing a table of 2-conditions, characterized in that the condition on the one or more of the attributes comprises a condition on two of the attributes, using the table of 1-conditions.

52. A method according to claim 51, wherein constructing the contingency table comprises constructing a plurality of respective tables of q-conditions, for a sequence of one or more integers $q \geq 3$, characterized in that for each q, the condition on the one or more of the attributes comprises a condition on a group of q of the attributes, wherein for each q, the corresponding table is constructed using the table of q-1-conditions previously constructed.

53. A method according to claim 52, wherein each of the tables of q-conditions is stored in the memory as it is constructed, and wherein for each q, the corresponding table of q-1-conditions is deleted from the memory after the table of q-conditions is constructed.

54. A method according to claim 49, and comprising:
receiving data from an input device, the data including values of at least some of the attributes of the given item; and
applying the association rules to the values included in the data so as to predict the unknown value of the attribute of interest of the given item.

55. A system for predicting an unknown value of an attribute of interest of a given item from a population of items, each item in the population having a plurality of variable attributes including the attribute of interest, comprising:
an input device, which receives data indicative of values of at least some of the attributes of the given item;
a memory, which stores association rules regarding the population, the association rules including at least one generalized association rule, each association rule comprising one or more conditions on one or more respective attribute values of the items predictive of the value of the attribute of interest, and the at least one generalized rule comprising a logical combination of such conditions using at least one logical operation from a group consisting of disjunction and negation in defining the conditions of the rule; and
a processor, which receives the data from the input device and reads the association rules from the memory, and which applies the association rules including the at least one generalized association rule to the values included in the data so as to predict the unknown value of the attribute of interest and which generates an output responsive to the prediction.

56. A system according to claim 55, wherein the processor applies a subset of the rules consisting of rules whose one or more conditions are fulfilled by known values of attributes of the given item other than the item of interest.

57. A system according to claim 55, wherein the processor finds probabilities corresponding to the determined association rules and applies the probabilities to compute a cumulative probability that the attribute of interest has a given value.

58. A system according to claim 57, wherein the processor computes a weighted sum of the probabilities corresponding respectively to the association rules applied in predicting the value.

59. A system according to claim 57, wherein the processor determines a probability decision point such that when the cumulative probability is greater than the decision point, the attribute of interest is predicted to have a first value, and when the probability of interest is less than the decision point, the attribute of interest is predicted to have a different, second value.

60. A system according to claim 59, wherein the processor defines an ambiguity range of probabilities including the decision point in which the predicted value is ambiguous.

61. A system according to claim 60, wherein the processor compares the training sample and at least a portion of the overall population from which the given item is taken, and determines an extent of the ambiguity range responsive to a measure of the similarity of the training sample and the at least portion of the overall population.

62. A system according to claim 59, wherein the processor determines the decision point such that a total number of prediction errors is minimized.

63. A system according to claim 59, wherein an error cost is assigned to each of a plurality of types of prediction errors, and wherein the processor determines the decision point such that a total cost of prediction errors is minimized.

64. A system according to claim 55, wherein the items comprise records in a database, and the attributes comprise fields in the records, and wherein the processor applies the association rules to predict the unknown value of a database field.

65. A system according to claim 64, wherein the unknown value comprises predicting a Boolean value.

66. A system according to claim 55, wherein the items comprise sounds, and the attribute values comprise characteristics of sound signals corresponding to the sounds, and wherein the processor applies the association rules to identify a sound signal.

67. A system according to claim 66, wherein the processor finds a word corresponding to the signal.

68. A system according to claim 66, wherein the processor identifies a speaker who generated the sound signal.

69. A system according to claim 66, wherein the input device comprises a microphone.

70. A system according to claim 55, wherein the items comprise images, and the attribute values comprise image features, and wherein the processor applies the association rules to process an image.

71. A system according to claim 70, wherein the processor identifies a subject of the image.

72. A system according to claim 70, wherein the input device comprises a camera.

73. A system according to claim 70, wherein the input device comprises a scanner.

74. A system according to claim 55, and comprising an output device, which receives the output from the processor and performs an action responsive thereto.

75. A system according to claim 74, wherein the output device comprises a display, which displays the predicted value.

76. A system according to claim 75, wherein the display displays a probability associated with the predicted value.

77. A system according to claim 74, wherein the output device comprises an access controller, which controls an access responsive to the predicted value.

78. A system according to claim 74, wherein the output device comprises a sorter, which sorts the given item responsive to the predicted value.

79. A system according to claim 55, and comprising a computer, which receives a training sample of items within the population having known respective attribute values including the attribute of interest, and which determines the association rules and finds the at least one generalized association rule by processing the known attribute values.

80. A system according to claim 79, wherein the computer includes the processor.

81. A system for determining association rules for prediction of an unknown value of an attribute of interest of a given item from a population of items, each item in the population having a plurality of variable attributes including the attribute of interest, comprising:

an input device, which receives data indicative of values of attributes of a training sample of items within the population including the attribute of interest;

a memory, which stores the values of the attributes; and a computer, which reads the values from the memory and determines association rules regarding the population, the association rules including at least one generalized association rule, each association rule comprising one or more conditions on one or more respective attribute values of the items predictive of the value of the attribute of interest, and the at least one generalized rule comprising a logical combination of such conditions using at least one logical operation from a group consisting of disjunction and negation in defining the conditions of the rule, and which stores the association rules in the memory.

82. A method according to claim 81, wherein the computer finds the at least one generalized rule such that a support of the rule is maximized on the training sample.

83. A system according to claim 82, wherein the at least one generalized association rule predicts that the attribute of interest has a given value, and the support of the generalized rule in the training sample comprises at least ten times as many items having the given value of the attribute of interest as having another value, not equal to the given value.

84. A system according to claim 83, wherein the support of the generalized rule in the training sample comprises substantially only items having the given value of the attribute of interest.

85. A system according to claim 81, wherein the computer finds a plurality of generalized association rules such that an overlap of the respective supports of two or more of the plurality of rules on the training sample is minimized.

86. A system according to claim 81, wherein the computer finds a plurality of generalized association rules such that substantially all of the items in the training sample are included in the support of one or more of the generalized rules.

87. A system according to claim 86, wherein the plurality of generalized rules comprises first and second groups of generalized rules that are respectively predictive of first and second values of the attribute of interest, such that there is an approximately equal number of rules in each group.

88. A system according to claim 81, wherein the at least one generalized association rule comprises a rule predicting that the attribute of interest has a first value if a condition substantially of a form $\neg(C_{j1}^{(i)} v C_{j2}^{(i)} v \ldots v C_{jk}^{(i)})$ is fulfilled, wherein j1, j2, . . . , jk are indices enumerating conditions represented collectively as $C_{jm}^{(i)}$, m an arbitrary index running from 1 to k, and i an index representing a conclusion of the conditions, and wherein each $C_{jm}^{(i)}$ represents a condition on a known attribute value of the item other than the attribute of interest which is predictive that the attribute of interest will have another value, different from the first value.

89. A system according to claim 81, wherein the at least one generalized association rule comprises a rule predicting that the attribute of interest has a first value if a condition substantially of a form $(C_{j1}^{(i1)} v C_{j2}^{(i1)} v \ldots v C_{jk}^{(i1)})^\wedge \neg(C_{jk+1}^{(i2)} v C_{jk+2}^{(i2)} v \ldots v C_{jK}^{(i2)})$ is fulfilled, wherein j1, j2, . . . , jk, jk+1, jk+2, . . . , jK are indices enumerating conditions represented collectively as $C_{jm}^{(i1)}$ and $C_{jm}^{(i2)}$, m an arbitrary index running from 1 to K, and i1 and i2 are indices representing conclusions of the conditions, and wherein each $C_{jm}^{(i1)}$ represents a condition on a known attribute value of the item other than the attribute of interest which is predictive that the attribute of interest will have the first value, and each $C_{jm}^{(i2)}$ represents a condition on a known attribute value of the item other than the attribute of interest which is predictive that the attribute of interest will have another value, different from the first value.

90. A system according to claim 89, wherein the computer finds the set of rules $\{C_{j1}^{(i1)} \ldots C_{jk}^{(i1)}\}$ and then searches for rules in the set $\{C_{jk+1}^{(i2)} \ldots C_{jK}^{(i2)}\}$ on the support of $\{C_{j1}^{(i1)} \ldots C_{jk}^{(i1)}\}$.

91. A system according to claim 81, wherein the computer finds simple association rules, wherein each simple association rule comprises one or more conditions on one or more respective attribute values of the items predictive of the value of the attribute of interest, such that if the simple association rule includes more than one such condition, the conditions are combined using the logical conjunction operation in defining the conditions of the rule.

92. A system according to claim 91, wherein the simple and the at least one generalized association rules are applied jointly to predict the unknown value.

93. A system according to claim 92, wherein a weighted sum of values of the attribute of interest predicted by the rules is used by the computer to predict the unknown value.

94. A system according to claim 93, wherein the computer computes probabilities respectively associated with the simple and generalized rules, which are used to weight the predicted values in computing the weighted sum.

95. A system according to claim 93, wherein the computer finds the at least one generalized association rule by combining a plurality of the simple association rules.

96. A system according to claim 95, wherein the at least one generalized rule includes a disjunction of two or more of the simple rules.

97. A system according to claim 95, wherein the at least one generalized rule includes a negation of one or more of the simple rules.

98. A system according to claim 91, wherein the computer determines substantially all simple association rules pertaining to the sample having respective probability and support greater than predetermined minimum values thereof.

99. A system according to claim 81, wherein the computer encodes values of the attributes according to the frequency of their occurrence in the training sample.

100. A system according to claim 99, wherein the computer encodes the values by calculating hash functions.

101. A system according to claim 99, wherein the computer assigns a distinguishable code to values occurring at less than a predetermined frequency in the training, sample, whereby such values are substantially excluded from the determination the of association rules.

102. A system for determining association rules for prediction of an unknown value of an attribute of interest of a given item from a population of items, each item in the population having a plurality of variable attributes including the attribute of interest, comprising:

an input device, which receives data indicative of values of attributes of a training sample of items within the population including the attribute of interest;

a memory, which stores the values of the attributes; and a computer, which reads the values from the memory and determines simple association rules regarding the population, each simple association rule comprising one or more conditions on one or more respective attribute values of the items predictive of the value of the attribute of interest, such that if the simple association rule includes more than one such condition, the conditions are combined using a logical conjunction operation in defining the conditions of the rule, and which stores the association rules in the memory, wherein substantially all simple association rules applicable to the sample having respective probability and support greater than predetermined minimum values thereof are determined.

103. A system according to claim 102, wherein the computer determines the association rules by constructing a contingency table, each of whose entries corresponds to the number of items in the sample having a given value of the attribute of interest and a given, respective value of another one of the attributes.

104. A system for determining association rules for prediction of an unknown value of an attribute of interest of a given item from a population of items, each item in the population having a plurality of variable attributes including the attribute of interest, comprising:

an input device, which receives data indicative of values of attributes of a training sample of items within the population including the attribute of interest;

a memory, which stores the values of the attributes; and a computer, which reads the values from the memory and determines association rules regarding the population, each association rule comprising one or more conditions on one or more respective attribute values of the items predictive of the value of the attribute of interest, and which stores the association rules in the memory, wherein the computer determines the association rules by constructing one or more contingency tables, each of whose entries corresponds to the number of items in the sample having a given value of the attribute of interest and satisfying a given, respective condition on one or more of the attributes other than the attribute of interest.

105. A system according to claim 104, wherein the one or more contingency tables comprise a table of 1-conditions, characterized in that the condition on the one or more of the attributes comprises a condition on a single one of the attributes.

106. A system according to claim 105, wherein the one or more contingency tables comprise a table of 2-conditions, characterized in that the condition on the one or more of the attributes comprises a condition on two of the attributes, which is constructed by the computer using the table of 1-conditions.

107. A system according to claim 106, wherein the one or more contingency tables comprise a plurality of respective tables of q-conditions, for a sequence of one or more integers $q \geq 3$, characterized in that for each q, the condition on the one or more of the attributes comprises a condition on a group of q of the attributes, wherein for each q, the computer constructs the corresponding table using the table of q-1-conditions previously constructed.

108. A system according to claim 107, wherein the computer stores each of the tables of q-conditions in the memory as it is constructed, and wherein for each q, the computer deletes the corresponding table of q-1-conditions from the memory after the table of q-conditions is constructed.

* * * * *